US010831024B2

United States Patent
Yamashiro et al.

(10) Patent No.: US 10,831,024 B2
(45) Date of Patent: Nov. 10, 2020

(54) OPTICAL SCANNING APPARATUS, IMAGE PROJECTING APPARATUS, AND MOBILE OBJECT

(71) Applicants: Toshihiro Yamashiro, Kanagawa (JP); Tsuyoshi Hashiguchi, Kanagawa (JP)

(72) Inventors: Toshihiro Yamashiro, Kanagawa (JP); Tsuyoshi Hashiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/299,910

(22) Filed: Mar. 12, 2019

(65) Prior Publication Data

US 2019/0285886 A1    Sep. 19, 2019

(30) Foreign Application Priority Data

Mar. 16, 2018  (JP) ................................ 2018-049620

(51) Int. Cl.
    *G02B 27/01*        (2006.01)
    *G03G 15/04*        (2006.01)
    (Continued)

(52) U.S. Cl.
    CPC ....... *G02B 27/0101* (2013.01); *G02B 26/101* (2013.01); *G02B 26/127* (2013.01);
    (Continued)

(58) Field of Classification Search
    CPC .............. G02B 26/101; G02B 26/127; G02B 27/0101; G02B 26/0833;
    (Continued)

(56) References Cited

U.S. PATENT DOCUMENTS

| 7,961,368 B2 * | 6/2011 | Mizoguchi ......... | G02B 26/0858 |
| | | | 359/212.2 |
| 2005/0265419 A1 * | 12/2005 | Fujii ................... | H01S 5/06256 |
| | | | 372/96 |

(Continued)

FOREIGN PATENT DOCUMENTS

| EP | 3 264 156 A1 | 1/2018 |
| JP | 2004-110030 | 4/2004 |

(Continued)

OTHER PUBLICATIONS

Extended European Search Report dated Jun. 28, 2019 in Patent Application No. 19160374.5, 11 pages.

*Primary Examiner* — Sejoon Ahn
(74) *Attorney, Agent, or Firm* — Oblon, McClelland, Maier & Neustadt, L.L.P.

(57) ABSTRACT

An optical scanning apparatus, an image projecting apparatus, and a mobile object. The optical scanning apparatus includes a light source to emit light, a light deflector to deflect the light emitted from the light source at least in a sub-scanning direction to perform optical scanning on a scan region, a light receiver to receive, within a predetermined range in the sub-scanning direction, the light used for optical scanning performed by the light deflector, and a controller to control the light deflector based on a number of times of light reception of the light receiver at a plurality of positions in the sub-scanning direction within the predetermined range. The image projecting apparatus includes the optical scanning apparatus, and a projection optical system configured to project light emitted from the optical scanning apparatus to the scan region.

14 Claims, 25 Drawing Sheets

(51) Int. Cl.
*G02B 26/10* (2006.01)
*G02B 26/12* (2006.01)
*H04N 1/047* (2006.01)
*H04N 1/053* (2006.01)
*G02B 26/08* (2006.01)
*H04N 9/31* (2006.01)
*G03G 15/043* (2006.01)
*H04N 1/04* (2006.01)

(52) U.S. Cl.
CPC ....... G03G 15/04072 (2013.01); H04N 1/047 (2013.01); H04N 1/053 (2013.01); *G02B 26/0833* (2013.01); *G02B 2027/014* (2013.01); *G02B 2027/0114* (2013.01); *G03G 15/043* (2013.01); *H04N 1/0443* (2013.01); *H04N 9/3194* (2013.01); *H04N 2201/0471* (2013.01); *H04N 2201/04732* (2013.01)

(58) Field of Classification Search
CPC ..... G02B 2027/0114; G03G 15/04072; H04N 1/047; H04N 1/053
See application file for complete search history.

(56) References Cited

U.S. PATENT DOCUMENTS

| | | | | |
|---|---|---|---|---|
| 2007/0103752 | A1* | 5/2007 | Kandori | G02B 26/101 359/196.1 |
| 2008/0204846 | A1* | 8/2008 | Itabashi | H04N 1/0473 359/237 |
| 2010/0085618 | A1* | 4/2010 | Fujii | G02B 26/105 359/199.1 |
| 2011/0025813 | A1 | 2/2011 | Suzuki et al. | |
| 2011/0064470 | A1* | 3/2011 | Akiyama | G02B 26/127 399/151 |
| 2011/0279622 | A1* | 11/2011 | Ohide | B41J 2/471 347/118 |
| 2016/0334637 | A1 | 11/2016 | Saisho et al. | |
| 2017/0154558 | A1 | 6/2017 | Atsuumi et al. | |
| 2018/0124364 | A1* | 5/2018 | Yata | H04N 9/3167 |
| 2018/0252916 | A1 | 9/2018 | Nakamura et al. | |
| 2019/0139290 | A9* | 5/2019 | Solomon | G06F 3/013 |
| 2019/0143905 | A1* | 5/2019 | Cazzoli | G06F 3/04847 348/148 |
| 2019/0144270 | A1* | 5/2019 | Liu | B81B 7/0067 359/513 |
| 2019/0146129 | A1* | 5/2019 | Mockarram-Dorri | B60K 37/04 359/630 |
| 2020/0029050 | A1* | 1/2020 | Antunes | H04N 5/23245 |

FOREIGN PATENT DOCUMENTS

| | | |
|---|---|---|
| JP | 2014-235268 A | 12/2014 |
| JP | 2018-155989 | 10/2018 |
| WO | WO 2018/025833 A2 | 2/2018 |

\* cited by examiner

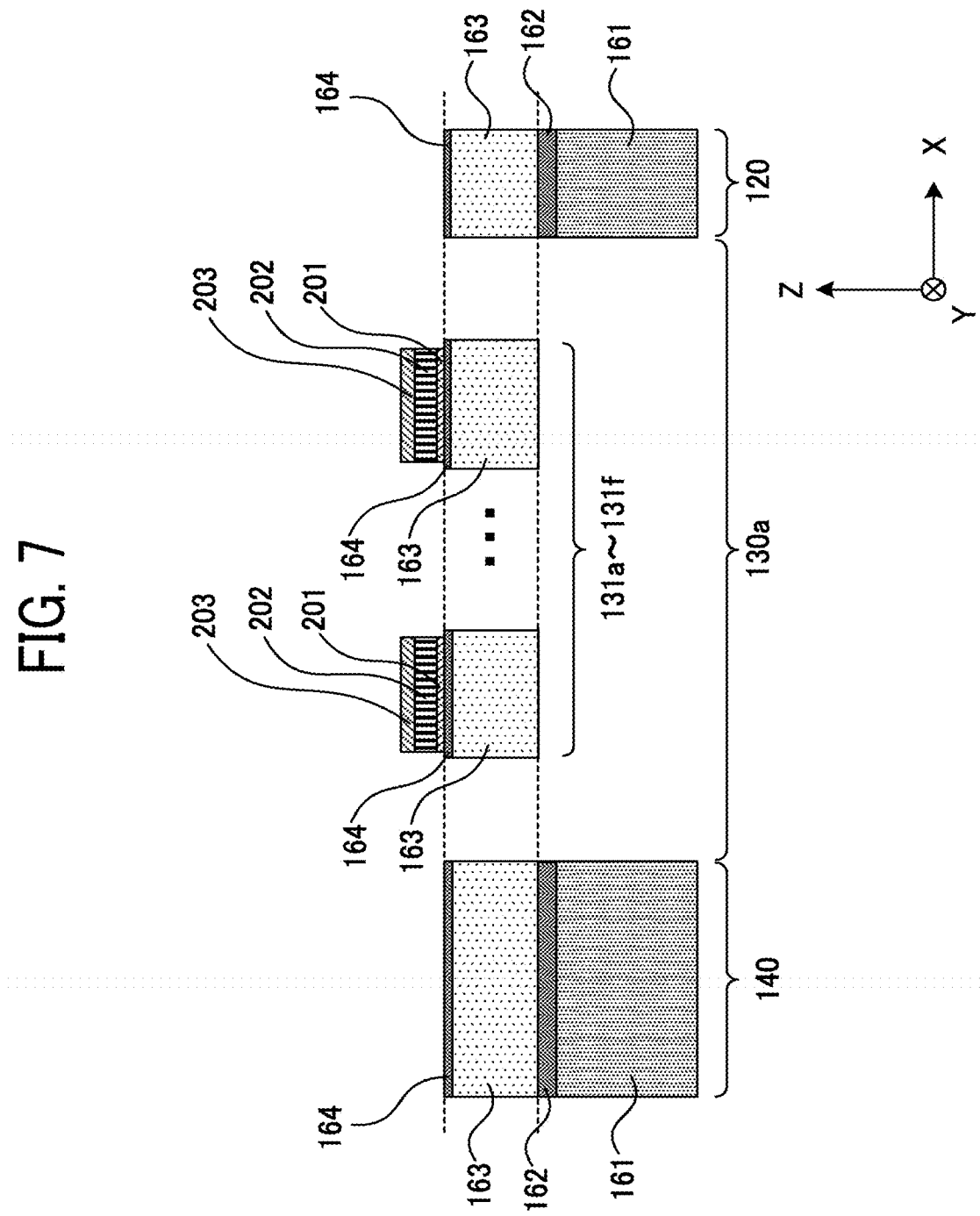

OPTICAL SCANNING APPARATUS, IMAGE PROJECTING APPARATUS, AND MOBILE OBJECT

CROSS-REFERENCE TO RELATED APPLICATION

This patent application is based on and claims priority pursuant to 35 U.S.C. § 119(a) to Japanese Patent Application No. 2018-049620, filed on Mar. 16, 2018, in the Japan Patent Office, the entire disclosure of which is hereby incorporated by reference herein.

BACKGROUND

Technical Field

Embodiments of the present disclosure relate to an optical scanning apparatus, an image projecting apparatus, and a mobile object.

Background Art

In the related art, an optical scanning apparatus that deflects light from a light source in a main scanning direction and a sub-scanning direction to perform optical scanning on a scan region is known in the art.

For example, an optical scanning apparatus is known that includes a light deflector and light receivers. The light deflector deflects light from a light source in a main scanning direction and a sub-scanning direction to perform optical scanning on a scan region, and the light receivers are provided in both end portions of the scan region in a light deflection direction. In this optical scanning apparatus, in accordance with the timing at which the light receiver detects a laser beam, the deflection amplitude of the laser beam in the main scanning direction is controlled. Specifically, the time difference between laser-beam detecting timing at which the beam moves between the light receivers in an outward main scanning direction and laser-beam detecting timing at which the beam moves between the light receivers in a homeward main scanning direction is measured. If the time difference is short, it is determined that the deflection amplitude of the laser beam in the main scanning direction is narrow; and if the time difference is long, it is determined that the deflection amplitude of the laser beam in the main scanning direction is wide.

SUMMARY

Embodiments of the present disclosure described herein provide an optical scanning apparatus, an image projecting apparatus, and a mobile object. The optical scanning apparatus includes a light source to emit light, a light deflector to deflect the light emitted from the light source at least in a sub-scanning direction to perform optical scanning on a scan region, a light receiver to receive, within a predetermined range in the sub-scanning direction, the light used for optical scanning performed by the light deflector, and a controller to control the light deflector based on a number of times of light reception of the light receiver at a plurality of positions in the sub-scanning direction within the predetermined range. The image projecting apparatus includes the optical scanning apparatus, and a projection optical system configured to project light emitted from the optical scanning apparatus to the scan region. The light deflector of the optical scanning apparatus in the image projecting apparatus scans, with light that is modulated based on image information, the scan region to project an image. The mobile object includes the optical scanning apparatus or the image projecting apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a Q-Q' sectional view of the light deflector illustrated in FIG. 5;

Figure 1:
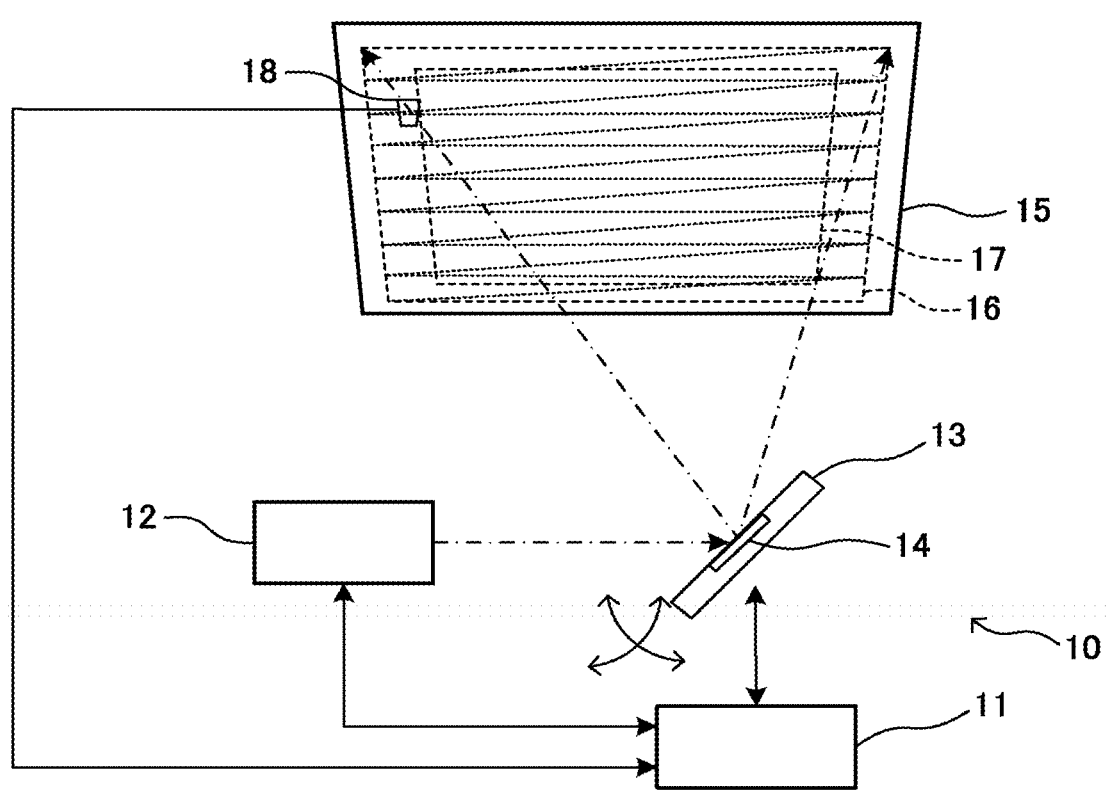
FIG. 1 is a schematic diagram illustrating an optical scanning apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Now, embodiments of the present disclosure will be described below in detail.

First Embodiment

First, an optical scanning apparatus according to this embodiment will be described in detail with reference to the drawings.

FIG. 1 schematically illustrates the optical scanning apparatus according to this embodiment.

As illustrated in FIG. 1, a light source apparatus 12 emits light, and under control of a control apparatus 11, an optical scanning apparatus 10 deflects the light on a reflection surface 14 included in a light deflector 13 to perform optical scanning on a scan surface 15. The light deflector 13 can perform optical scanning in a scannable region 16, and the scannable region 16 includes an effective scan region 17. A light receiver 18 is provided on the scan surface 15, inside the scannable region 16 and outside the effective scan region 17. The control apparatus 11, the light deflector 13, and the light receiver 18 constitute the optical scanning apparatus 10.

The control apparatus 11 is, for example, an electronic circuit unit including a central processing unit (CPU), a field-programmable gate array (FPGA), and the like. The light source apparatus 12 is, for example, a laser that emits laser light. The light deflector 13 is, for example, a micro electromechanical system (MEMS) device including the reflection surface 14 and capable of moving the reflection surface 14. The scan surface 15 is, for example, a screen. The light receiver 18 is, for example, a photodiode (PD) that receives light and outputs a light reception signal.

The control apparatus 11 generates control signals for the light source apparatus 12 and the light deflector 13 based on optical scanning information acquired from an external apparatus or the like, and outputs drive signals to the light source apparatus 12 and the light deflector 13 based on the control signals. In addition, in accordance with a signal output from the light source apparatus 12, a signal output from the light deflector 13, and a light reception signal output from the light receiver 18, the control apparatus 11 achieves synchronization between the light source apparatus 12 and the light deflector 13, and generates the control signals.

In accordance with a drive signal input from the control apparatus 11, the light source apparatus 12 emits light from a light source.

In accordance with a drive signal input from the control apparatus 11, the light deflector 13 moves the reflection surface 14 at least either monoaxially (one-dimensionally) or biaxially (two-dimensionally) to deflect the light from the light source apparatus 12. Note that the light deflector 13 according to this embodiment may be any light deflecting means for deflecting light in at least a sub-scanning direction to perform optical scanning on the scan region, the sub-scanning direction corresponding to a direction in which scan lines are arranged. Thus, the light deflecting means may perform optical scanning in both a main scanning direction and the sub-scanning direction, the main scanning direction corresponding to a direction in which the scan lines extend. Alternatively, different light deflecting means may perform optical scanning in the main scanning direction and the sub-scanning direction. Note that the drive signal is a signal having a predetermined drive frequency. The light deflector 13 has a predetermined unique frequency (also called resonant frequency).

Thus, for example, under control of the control apparatus 11 based on image information that is an example of the optical scanning information, the reflection surface 14 of the light deflector 13 is biaxially moved in a reciprocal manner within a predetermined range, and the light that is emitted from the light source apparatus 12 to enter the reflection surface 14 is deflected and optical scanning is performed, so that a given image can be projected onto the scan surface 15.

Note that the light deflector 13 and control of the control apparatus 11 will be described later in detail.

Next, a hardware configuration of an example of the optical scanning apparatus 10 will be described with reference to FIG. 2.

Figure 2:
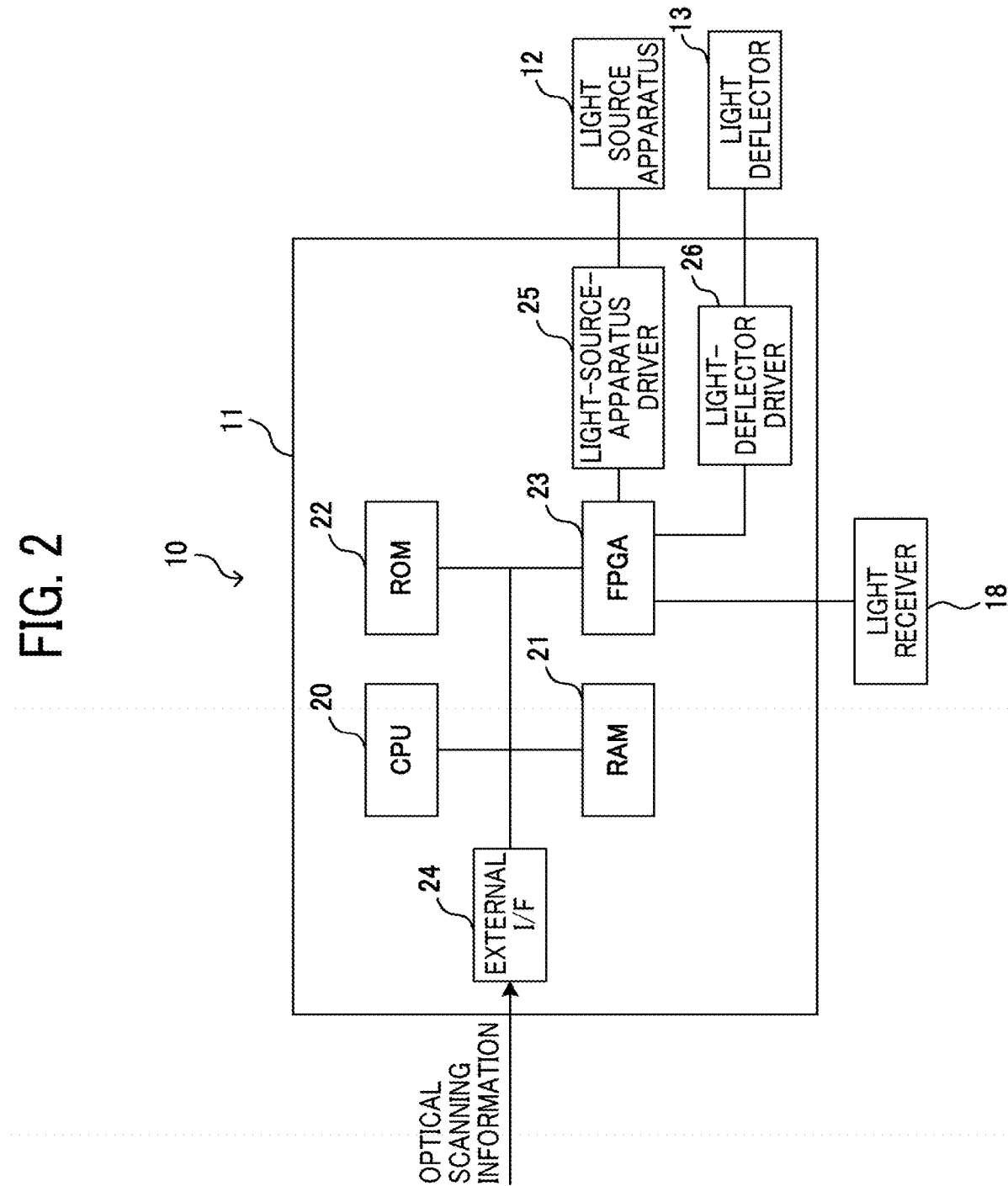
FIG. 2 illustrates a hardware configuration of the optical scanning apparatus of FIG. 1.

FIG. 2 illustrates the hardware configuration of the optical scanning apparatus 10.

As illustrated in FIG. 2, the optical scanning apparatus 10 includes the control apparatus 11, the light source apparatus 12, the light deflector 13, and the light receiver 18, which are electrically connected to each other. In particular, the control apparatus 11 will be described below in detail.

The control apparatus 11 includes a CPU 20, a random access memory (RAM) 21, a read-only memory (ROM) 22, an FPGA 23, an external interface (I/F) 24, a light-source-apparatus driver 25, and a light-deflector driver 26.

The CPU 20 is an arithmetic device that reads programs and data from a storage device such as the ROM 22 to the RAM 21 and performs processing to control the entirety of the control apparatus 11 or to implement functions of the control apparatus 11. The RAM 21 is a volatile storage device that temporarily holds programs and data.

The ROM 22 is a non-volatile storage device that can hold programs and data even when the power is off. The ROM 22 stores processing programs that is executed by the CPU 20 to control the functions of the optical scanning apparatus 10 and data.

The FPGA 23 is a circuit that outputs control signals that are appropriate for the light-source-apparatus driver 25 and the light-deflector driver 26 in accordance with the processing of the CPU 20. In addition, the FPGA 23 acquires output signals from the light source apparatus 12 and the light deflector 13 through the light-source-apparatus driver 25 and the light-deflector driver 26, and further acquires a light reception signal from the light receiver 18. Based on the output signals and the light reception signal, the FPGA 23 generates control signals.

The external I/F 24 is, for example, an interface to an external apparatus, a network, or the like. Examples of the external apparatus include a host device such as a personal computer (PC) and storage devices such as a universal serial bus (USB) memory, a secure digital (SD) card, a compact disc (CD), a digital versatile disc (DVD), a hard disk drive (HDD), and a solid state drive (SSD). Examples of the network include a controller area network (CAN) of an automobile, a local area network (LAN), vehicle-to-vehicle (V2V) communication, and the Internet. The external I/F 24 may have any configuration by which connection to the external apparatus or communication with the external apparatus can be realized. In addition, the external I/F 24 may be provided for each external apparatus.

The light-source-apparatus driver 25 is an electric circuit that outputs a drive signal such as a drive voltage to the light source apparatus 12 in accordance with a control signal that has been input.

The light-deflector driver 26 is an electric circuit that outputs a drive signal such as a drive voltage to the light deflector 13 in accordance with a control signal that has been input.

In the control apparatus 11, the CPU 20 acquires the optical scanning information from an external apparatus or a network through the external I/F 24. Note that any configuration may be used as long as the CPU 20 can acquire the optical scanning information, and the optical scanning information may be stored in the ROM 22 or in the FPGA 23 in the control apparatus 11, or a storage device such as an SSD may be newly provided in the control apparatus 11 and the optical scanning information may be stored in the storage device.

The optical scanning information herein is information indicating the way of optical scanning to be performed on the scan surface 15 by using the light source apparatus 12 and the light deflector 13. For example, the optical scanning information is image data in a case where an image is to be displayed by optical scanning, and the optical scanning information is writing data indicating the order and portion of writing in a case where optical writing is to be performed by optical scanning. Furthermore, for example, the optical scanning information is irradiation data indicating the timing and range of irradiation of light for object recognition in a case where an object is to be recognized by optical scanning.

Next, a functional configuration of the control apparatus 11 in the optical scanning apparatus 10 will be described with reference to FIG. 3.

Figure 3:
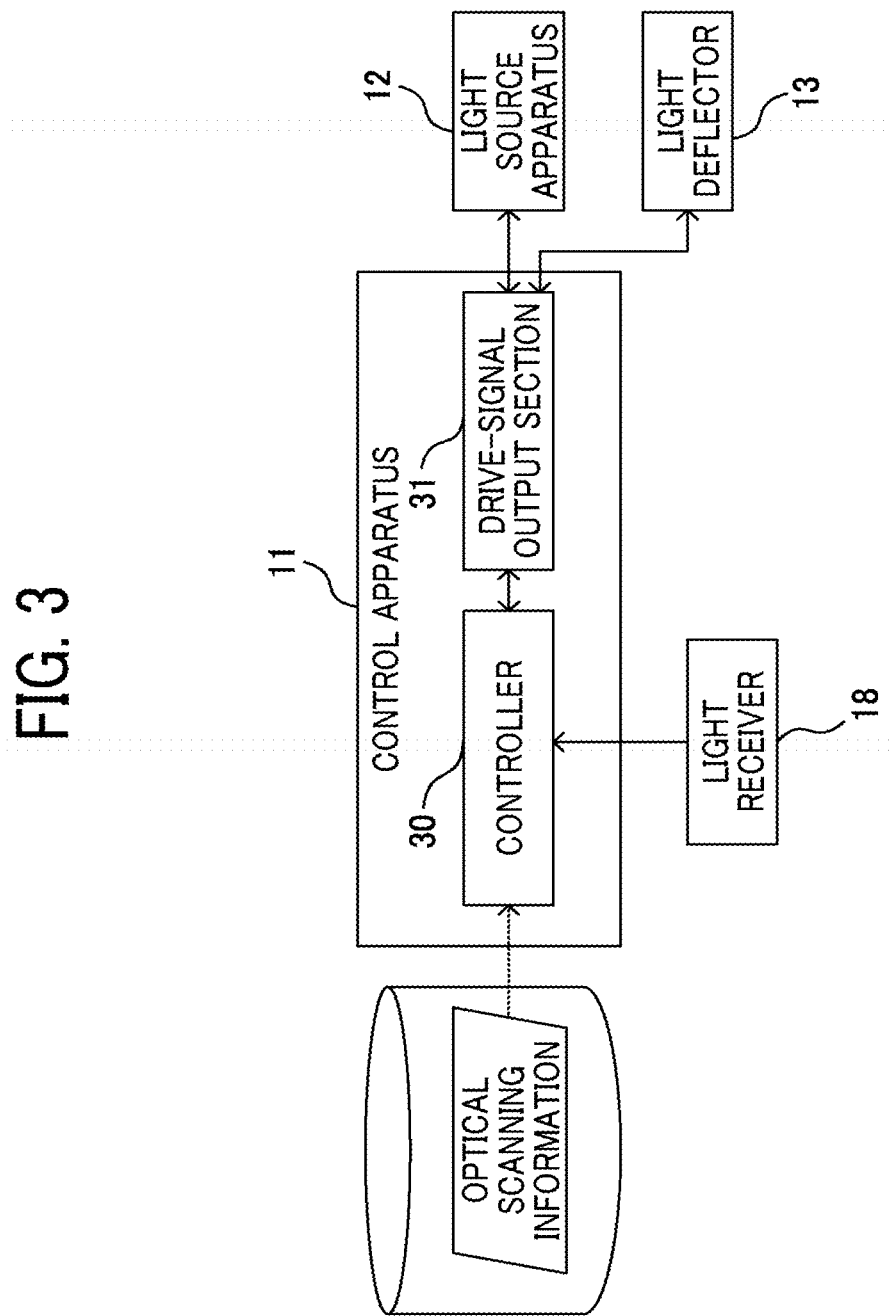
FIG. 3 is a block diagram illustrating functions of a control apparatus in the optical scanning apparatus of FIG. 1.

FIG. 3 is a block diagram illustrating the functions of the control apparatus 11 in the optical scanning apparatus 10.

The control apparatus 11 according to this embodiment can realize the functional configuration described below by using commands from the CPU 20 and the hardware configuration illustrated in FIG. 2.

As illustrated in FIG. 3, the control apparatus 11 includes a controller 30 and a drive-signal output section 31 as functions. The controller 30 is, for example, control means realized by the CPU 20, the FPGA 23, or the like. The controller 30 acquires the optical scanning information and signals from devices, generates control signals based on the optical scanning information and signals, and outputs the control signals to the drive-signal output section 31.

For example, the controller 30 acquires image data from an external apparatus or the like as the optical scanning information, generates a control signal from the image data through predetermined processing, and outputs the control signal to the drive-signal output section 31. In addition, the controller 30 acquires output signals from the light source apparatus 12 and the light deflector 13 through the drive-signal output section 31, and generates control signals based on the output signals. Furthermore, the controller 30 acquires a light reception signal from the light receiver 18, and generates a control signal based on the acquired light reception signal.

The drive-signal output section 31 is realized by the light-source-apparatus driver 25, the light-deflector driver 26, and the like, and outputs drive signals to the light source apparatus 12 and the light deflector 13 based on control signals that have been input. The drive-signal output section 31 serves, for example, as application means for applying a drive voltage to the light source apparatus 12 or the light deflector 13. The drive-signal output section 31 may be provided for each destination to which a drive signal is output.

Note that the drive signal is a signal for controlling the driving of the light source apparatus 12 or the light deflector 13. For example, in the light source apparatus 12, the drive signal is a drive voltage for controlling irradiation timing and irradiation intensity of the light source. In addition, for example, in the light deflector 13, the drive signal is a drive voltage for controlling the timing and range of movement of the reflection surface 14 included in the light deflector 13.

Next, a process in which the optical scanning apparatus 10 performs optical scanning on the scan surface 15 will be described with reference to FIG. 4.

Figure 4:
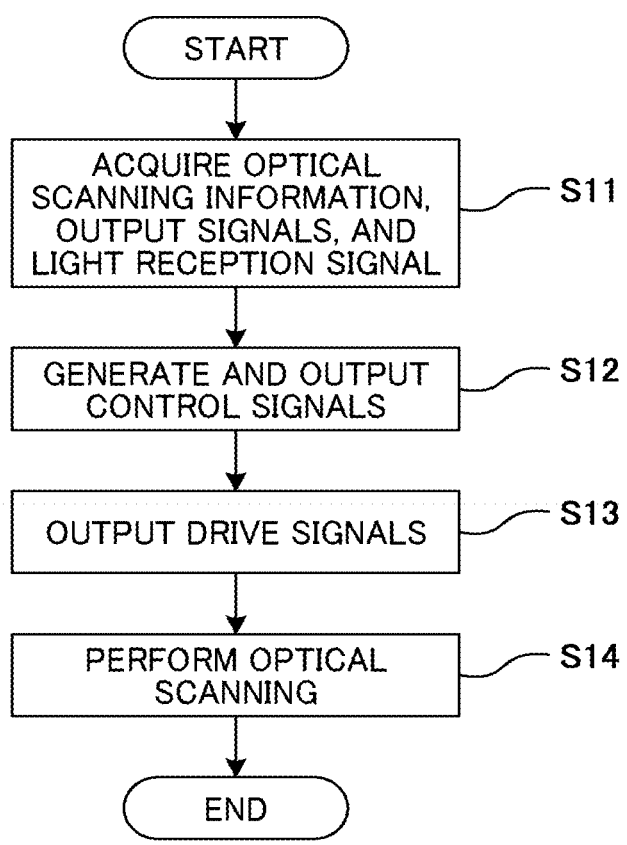
FIG. 4 is a flowchart illustrating a process performed by the optical scanning apparatus of FIG. 1.

FIG. 4 is a flowchart illustrating the process performed by the optical scanning apparatus 10.

In step S11, the controller 30 acquires optical scanning information from an external apparatus or the like. In addition, the controller 30 acquires output signals from the light source apparatus 12 and the light deflector 13 through the drive-signal output section 31 and acquires a light reception signal from the light receiver 18.

In step S12, the controller 30 generates control signals from the acquired optical scanning information, output signals, and light reception signal, and outputs the control signals to the drive-signal output section 31. Since the output signals and light reception signal are not acquired in some cases at the time of starting, a predetermined operation may be performed in another step at the time of starting.

In step S13, the drive-signal output section 31 outputs, to the light source apparatus 12 and the light deflector 13, drive signals based on the control signals that have been input.

In step S14, the light source apparatus 12 emits light in accordance with a drive signal that has been input. In addition, the light deflector 13 moves the reflection surface 14 in accordance with a drive signal that has been input. The driving of the light source apparatus 12 and the light deflector 13 causes light to be deflected in a given direction, and optical scanning is performed.

Note that in the optical scanning apparatus 10 according to this embodiment, the single control apparatus 11 includes the apparatuses and functions for controlling the light source apparatus 12 and the light deflector 13. However, a light-source-apparatus control apparatus and a light-deflector control apparatus may be separately provided.

In addition, in the optical scanning apparatus 10 according to this embodiment, the single control apparatus 11 has the functions of the controller 30 and the functions of the drive-signal output section 31 for the light source apparatus 12 and the light deflector 13. However, these functions may be separately present, and, for example, a drive-signal output apparatus including the drive-signal output section 31 may be provided separately from the control apparatus 11 including the controller 30.

Next, the light deflector 13 will be described in detail with reference to FIGS. 5 to 7.

Figure 5:
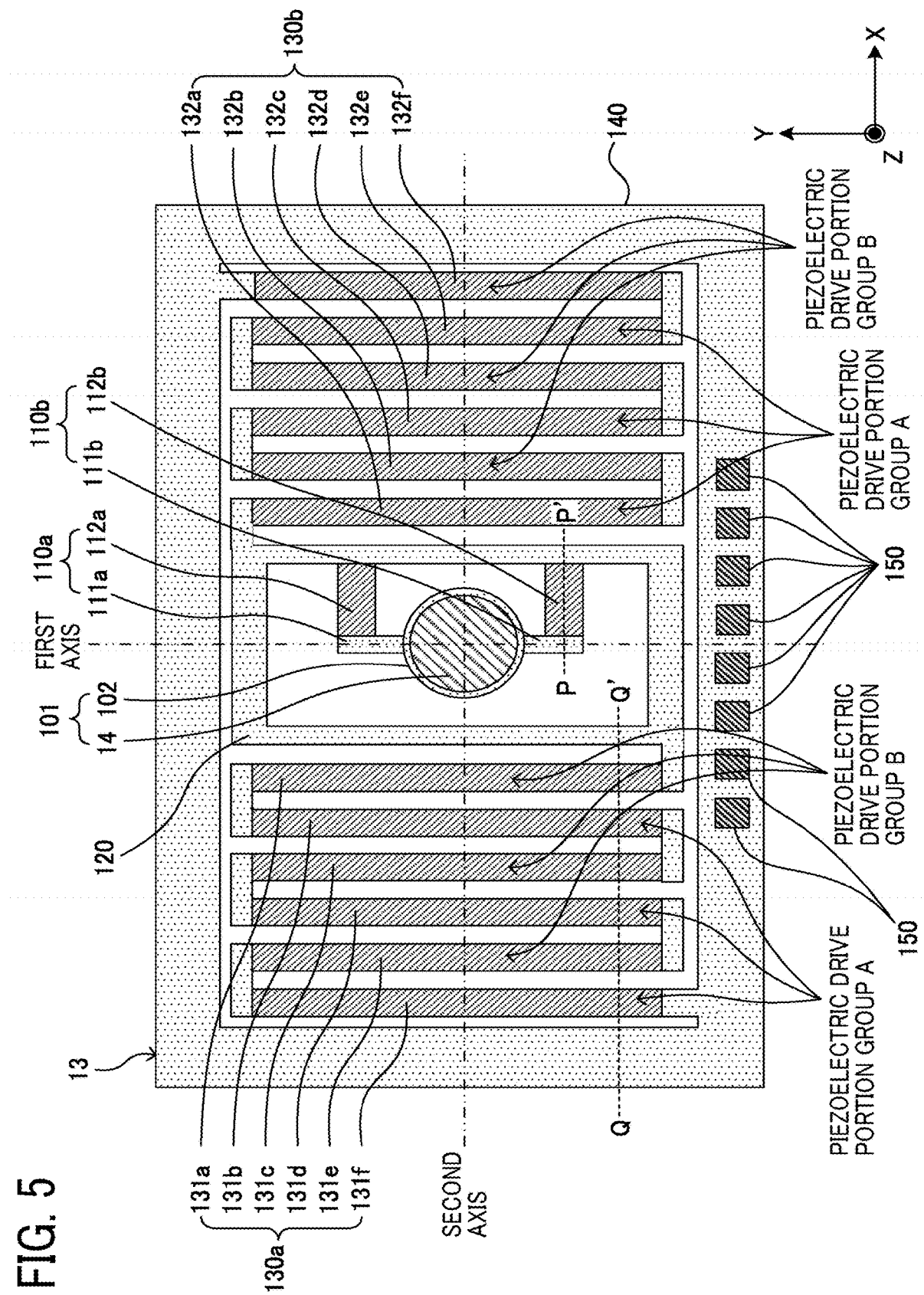
FIG. 5 is a plan view of a light deflector in the optical scanning apparatus of FIG. 1 when seen in a +Z direction.

FIG. 5 is a plan view of the light deflector 13 of a double-supported type, by which light can be deflected biaxially.

Figure 6:
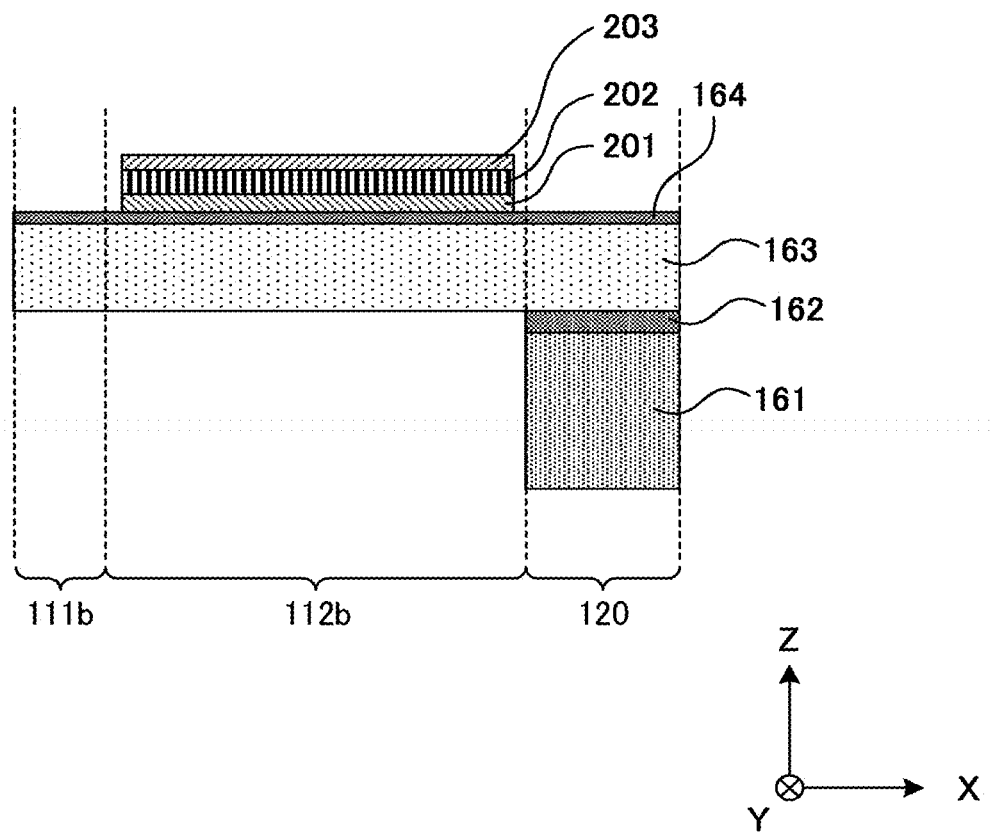
FIG. 6 is a P-P' sectional view of the light deflector illustrated in FIG. 5.

FIG. 6 is a P-P' sectional view of FIG. 5.

FIG. 7 is a Q-Q' sectional view of FIG. 5.

As illustrated in FIG. 5, the light deflector 13 includes a mirror portion 101, first drive portions 110a and 110b, a first support portion 120, second drive portions 130a and 130b, a second support portion 140, and an electrode connection portion 150. The mirror portion 101 reflects incident light. The first drive portions 110a and 110b are connected to the mirror portion 101 and drive the mirror portion 101 around a first axis that is parallel to the Y-axis. The first support portion 120 supports the mirror portion 101 and the first drive portions 110a and 110b. The second drive portions 130a and 130b are connected to the first support portion 120 and drive the mirror portion 101 and the first support portion 120 around a second axis that is parallel to the X-axis. The second support portion 140 supports the second drive portions 130a and 130b. The electrode connection portion 150 is electrically connected to the first drive portions 110a and 110b, the second drive portions 130a and 130b, and the control apparatus 11.

In the light deflector 13, for example, components are integrally formed as follows. On a single silicon-on-insulator (SOI) substrate, the reflection surface 14, first piezoelectric drive portions 112a and 112b, second piezoelectric drive portions 131a to 131f and 132a to 132f, the electrode connection portion 150, and the like are formed, and then the substrate is processed by etching or the like. Note that the components may be formed after the SOI substrate has been processed or while the SOT substrate is being processed.

As illustrated in FIG. 6, the SOI substrate is a substrate in which, on a first silicon layer formed of single crystal silicon (Si), a silicon oxide layer 162 is formed, and on the silicon oxide layer 162, a second silicon layer formed of single crystal silicon is further formed. Hereinafter, the first silicon layer is called silicon support layer 161, and the second silicon layer is called silicon active layer 163. Note that the SOI substrate is used after a silicon oxide layer 164 has been formed on the surface of the silicon active layer 163 by sintering.

The silicon active layer 163 has a small thickness in the Z-axis direction compared with the X-axis direction or the Y-axis direction, and thus, the silicon active layer 163, or members including the silicon active layer 163 and the silicon oxide layer 164, serve as an elastic portion having elasticity. Although the silicon oxide layer 164 is provided in this embodiment in order to prevent electric contact between the silicon active layer 163 and a lower electrode 201, the silicon oxide layer 164 may be replaced with another insulating material.

Note that the SOI substrate does not have to be planar and may have a curvature, for example. In addition, as long as the substrate can be integrally processed by etching or the like and can be partly elastic, the member used for forming the light deflector 13 is not limited to the SOT substrate.

The mirror portion 101 includes, for example, a circular mirror-portion material 102 and the reflection surface 14 that is formed on the +Z surface of the mirror-portion material 102. The mirror-portion material 102 includes, for example, the silicon active layer 163 and the silicon oxide layer 164.

The reflection surface 14 is formed of, for example, a metal thin film containing aluminum, gold, silver, or the like. In addition, a stiffener rib for the mirror portion may be formed on the −Z surface of the mirror-portion material 102 of the mirror portion 101.

The rib includes, for example, the silicon support layer 161 and the silicon oxide layer 162, and can suppress distortion of the reflection surface 14 as a result of movement.

As illustrated in FIG. 5, the first drive portions 110a and 110b include two torsion bars 111a and 111b and first piezoelectric drive portions 112a and 112b. An end of each of the torsion bars 111a and 111b is connected to the mirror-portion material 102, and the torsion bars 111a and 111b extend in a first axis direction to support the mirror portion 101 in a movable manner. An end of each of the first piezoelectric drive portions 112a and 112b is connected to a corresponding one of the torsion bars 111a and 111b, and the other end thereof is connected to an internal circumferential portion of the first support portion 120.

As illustrated in FIG. 6, the torsion bars 111a and 111b include the silicon active layer 163 and the silicon oxide layer 164. In addition, the first piezoelectric drive portions 112a and 112b include the silicon active layer 163, the silicon oxide layer 164, the lower electrode 201, a piezoelectric portion 202, and an upper electrode 203. The lower electrode 201, the piezoelectric portion 202, and the upper electrode 203 are formed in this order on the +Z surface of the silicon active layer 163 and the silicon oxide layer 164 serving as an elastic portion.

The upper electrode 203 and the lower electrode 201 are formed of, for example, gold (Au), platinum (Pt), or the like.

The piezoelectric portion 202 is formed of, for example, lead zirconate titanate (PZT), which is a piezoelectric material.

Referring back to FIG. 5, the first support portion 120 is, for example, a rectangular support body including the silicon support layer 161, the silicon oxide layer 162, the silicon active layer 163, and the silicon oxide layer 164, and surrounding the mirror portion 101.

The second drive portions 130a and 130b include, for example, the plurality of second piezoelectric drive portions 131a to 131f and 132a to 132f that are joined so as to meander. An end of each of the second drive portions 130a and 130b is connected to an outer circumferential portion of the first support portion 120, and the other end thereof is connected to an internal circumferential portion of the second support portion 140. This kind of structure is called meander structure. In addition, the structure of the second piezoelectric drive portions 131a to 131f and 132a to 132f, in which a long member and a member having a driving force are provided, is also called drive cantilever.

In this example, a connection part of the second drive portion 130a and the first support portion 120 and a connection part of the second drive portion 130b and the first support portion 120 are in point symmetry with respect to the center of the reflection surface 14. Furthermore, a connection part of the second drive portion 130a and the second support portion 140 and a connection part of the second drive portion 130b and the second support portion 140 are in point symmetry with respect to the center of the reflection surface 14.

As illustrated in FIG. 7, the second drive portions 130a and 130b include the silicon active layer 163, the silicon oxide layer 164, the lower electrode 201, the piezoelectric portion 202, and the upper electrode 203. The lower electrode 201, the piezoelectric portion 202, and the upper electrode 203 are formed in this order on the +Z surface of the silicon active layer 163 and the silicon oxide layer 164 serving as the elastic portion. The upper electrode 203 and the lower electrode 201 are formed of, for example, gold (Au), platinum (Pt), or the like. The piezoelectric portion 202 is formed of, for example, lead zirconate titanate (PZT), which is a piezoelectric material.

Referring back to FIG. 5, the second support portion 140 is, for example, a rectangular support body including the silicon support layer 161, the silicon oxide layer 162, the silicon active layer 163, and the silicon oxide layer 164, and surrounding the mirror portion 101, the first drive portions 110a and 110b, the first support portion 120, and the second drive portions 130a and 130b.

The electrode connection portion 150 is, for example, formed on the +Z surface of the second support portion 140 and are electrically connected to the upper electrode 203 and the lower electrode 201 of each of the first piezoelectric drive portions 112a and 112b and the second piezoelectric drive portions 131a to 131f, and the control apparatus 11 via electrode wiring of aluminum (Al) or the like.

Although this embodiment has illustrated an example in which the piezoelectric portion 202 is formed on a surface (+Z surface) of the silicon active layer 163 and the silicon oxide layer 164 serving as the elastic portion, the piezoelectric portion 202 may be formed on another surface (e.g., −Z surface) of the elastic portion, or on both the surface and the other surface of the elastic portion.

In addition, the shapes of the components are not limited to the shapes in the embodiment as long as the mirror portion 101 can be driven around the first axis or the second axis.

For example, the torsion bars 111a and 111b and the first piezoelectric drive portions 112a and 112b may have a shape with a curvature.

Furthermore, an insulating layer formed of a silicon oxide film may be formed on at least one of the +Z surface of the upper electrode 203 of the first drive portions 110a and 110b, the +Z surface of the first support portion 120, the +Z surface of the upper electrode 203 of the second drive portions 130a and 130b, and the +Z surface of the second support portion 140. In this case, electrode wiring is provided on the insulating layer, and the insulating layer is partially removed as an opening or is not formed at a connection spot where the upper electrode 203 or the lower electrode 201 and the electrode wiring are connected, so that the first drive portions 110a and 110b, the second drive portions 130a and 130b, and the electrode wiring can be designed with a higher degree of freedom, and furthermore, a short circuit as a result of contact between electrodes can be suppressed. Note that the insulating layer may be any member having an insulating property, and may have a function of an antiglare material by being formed as a thin film, for example.

Next, control of the control apparatus 11 that drives the first drive portions 110a and 110b and the second drive portions 130a and 130b of the light deflector 13 will be described in detail.

When a positive or negative voltage is applied in a polarizing direction, in proportion to the potential of the applied voltage, the piezoelectric portion 202 included in the first drive portions 110a and 110b and the second drive portions 130a and 130b is deformed (e.g., expands and contracts) and produces a so-called inverse piezoelectric effect. By using this inverse piezoelectric effect, the first drive portions 110a and 110b and the second drive portions 130a and 130b move the mirror portion 101. The angle in which light flux that is incident on the reflection surface 14 of the mirror portion 101 is deflected is called oscillation angle. The oscillation angle represents the degree of deflection by the light deflector 13. The oscillation angle with no voltage applied to the piezoelectric portion 202 is set as zero, and deflection angles that are larger and smaller than the above angle are called positive and negative oscillation angles, respectively.

First, control of the control apparatus 11 to drive the first drive portions 110a and 110b will be described.

In the first drive portions 110a and 110b, when a drive voltage is applied in parallel to the piezoelectric portion 202 of the first piezoelectric drive portions 112a and 112b through the upper electrode 203 and the lower electrode 201, the piezoelectric portion 202 is deformed. The deformation of the piezoelectric portion 202 causes the first piezoelectric drive portions 112a and 112b to be bent.

As a result, through the torsion of the two torsion bars 111a and 111b, a driving force acts on the mirror portion 101 around the first axis, and the mirror portion 101 is moved around the first axis. The drive voltage to be applied to the first drive portions 110a and 110b is controlled by the control apparatus 11.

Concurrently, the control apparatus 11 applies a drive voltage with a predetermined sine waveform to the first piezoelectric drive portions 112a and 112b of the first drive portions 110a and 110b, and thereby, the mirror portion 101 can be moved around the first axis in the period of the drive voltage with a predetermined sine waveform. Furthermore, for example, if the frequency of the sine-waveform voltage is set to about 20 kHz, which is substantially equal to a resonant frequency of the torsion bars 111a and 111b, by using resonance as a result of the torsion of the torsion bars 111a and 111b, the mirror portion 101 can be resonated at about 20 kHz.

Next, control of the control apparatus 11 that drives the second drive portions 130a and 130b will be described with reference to FIGS. 8A to 8C.

Figure 8A:
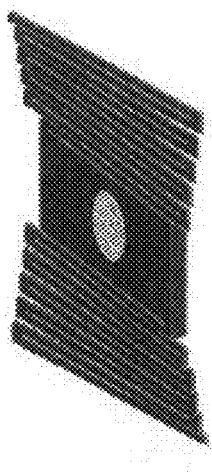
FIGS. 8A to 8C each schematically illustrate deformation of second drive portions of the light deflector.
Figure 8B:
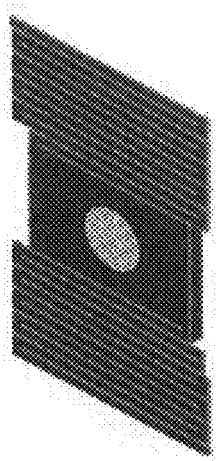
Figure 8C:
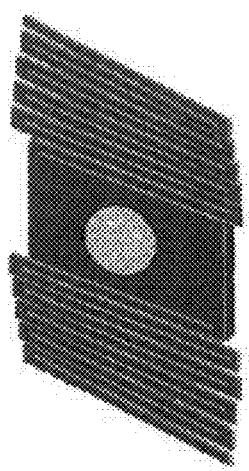

FIGS. 8A to 8C each schematically illustrate the driving of the second drive portions 130a and 130b of the light deflector 13. The hatched area is the mirror portion 101 and the like.

Among the plurality of second piezoelectric drive portions 131a to 131f of the second drive portion 130a, even-numbered second piezoelectric drive portions counted from the second piezoelectric drive portion 131a, which is the closest to the mirror portion 101, in other words, the second piezoelectric drive portions 131b, 131d, and 131f are called piezoelectric drive portion group A (also referred to as first actuator).

Furthermore, among the plurality of second piezoelectric drive portions 132a to 132f of the second drive portion 130b, odd-numbered second piezoelectric drive portions counted from the second piezoelectric drive portion 132a, which is the closest to the mirror portion 101, in other words, the second piezoelectric drive portions 132a, 132c, and 132e are also called piezoelectric drive portion group A. When the drive voltage is applied in parallel to the piezoelectric drive portion group A, the piezoelectric drive portion group A is bent in one direction as illustrated in FIG. 8A, and the mirror portion 101 is moved around the second axis to form a positive oscillation angle.

Among the plurality of second piezoelectric drive portions 131a to 131f of the second drive portion 130a, odd-numbered second piezoelectric drive portions counted from the second piezoelectric drive portion 131a, which is the closest to the mirror portion 101, in other words, the second piezoelectric drive portions 131a, 131c, and 131e are called piezoelectric drive portion group B (also referred to as second actuator).

Furthermore, among the plurality of second piezoelectric drive portions 132a to 132f of the second drive portion 130b, even-numbered second piezoelectric drive portions counted from the second piezoelectric drive portion 132a, which is the closest to the mirror portion 101, in other words, the second piezoelectric drive portions 132b, 132d, and 132f are also called piezoelectric drive portion group B. When the drive voltage is applied in parallel to the piezoelectric drive portion group B, the piezoelectric drive portion group B is bent in one direction as illustrated in FIG. 8C, and the mirror portion 101 is moved around the second axis to form a negative oscillation angle.

In addition, as illustrated in FIG. 8B, when no voltage is applied, or when the amount by which the mirror portion 101 is moved by the piezoelectric drive portion group A by using voltage application is equal to the amount by which the mirror portion 101 is moved by the piezoelectric drive portion group B by using voltage application, the oscillation angle becomes zero.

As illustrated in FIG. 8A or 8C, in the second drive portions 130a and 130b, the plurality of piezoelectric portions 202 of the piezoelectric drive portion group A or the plurality of piezoelectric portions 202 of the piezoelectric drive portion group B are bent, and thereby the amounts of movement as a result of bending can be accumulated so as to obtain a large oscillation angle of the mirror portion 101 around the second axis. In addition, the drive voltage is applied to the second drive portions 130a and 130b in a manner that FIGS. 8A to 8C are continuously repeated, and thereby the mirror portion 101 can be driven around the second axis.

The drive signal (drive voltage) to be applied to the second drive portions 130a and 130b is controlled by the control apparatus 11.

The drive voltage to be applied to the piezoelectric drive portion group A (hereinafter referred to as "drive voltage A") and the drive voltage to be applied to the piezoelectric drive portion group B (hereinafter referred to as "drive voltage B") will be described below with reference to FIGS. 9A to 9C. In addition, application means for applying the drive voltage A (first drive voltage) will be referred to as first application means, and application means for applying the drive voltage B (second drive voltage) will be referred to as second application means.

Figure 9A:
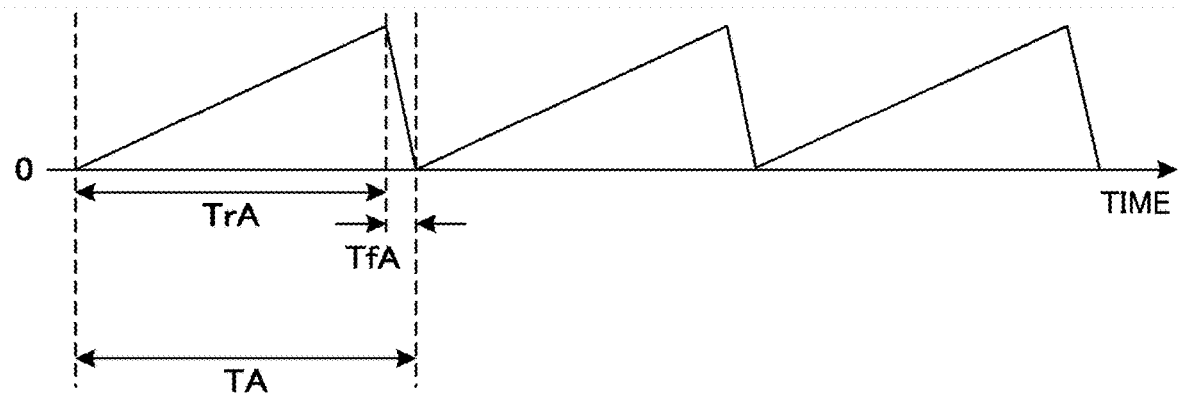
FIG. 9A illustrates a waveform of a drive voltage A to be applied to a piezoelectric drive portion group A of the light deflector.

FIG. 9A illustrates a waveform of the drive voltage A to be applied to the piezoelectric drive portion group A of the light deflector 13. FIG. 9B illustrates a waveform of the drive voltage B to be applied to the piezoelectric drive portion group B of the light deflector 13. FIG. 9C illustrates the waveform of the drive voltage A and the waveform of the drive voltage B that are superposed.

As illustrated in FIG. 9A, the waveform of the drive voltage A to be applied to the piezoelectric drive portion group A is, for example, a saw tooth wave, and the frequency thereof is, for example, 60 Hz. In the waveform of the drive voltage A, when the time width of a rise time in which the voltage increases from the minimum value to the next maximum value is denoted by TrA, and the time width of a fall time in which the voltage decreases from the maximum value to the next minimum value is denoted by TfA, for example, the ratio TrA:TfA=8.5:1.5 is set in advance. In this case, the ratio of TrA to one period is called symmetry of the drive voltage A.

Figure 9B:
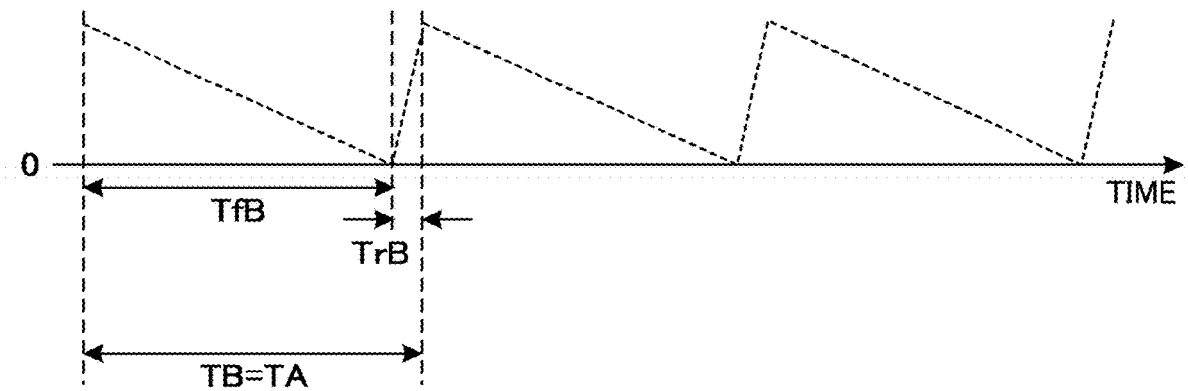
FIG. 9B illustrates a waveform of a drive voltage B to be applied to a piezoelectric drive portion group B of the light deflector.

As illustrated in FIG. 9B, the waveform of the drive voltage B to be applied to the piezoelectric drive portion group B is, for example, a saw tooth wave, and the frequency thereof is, for example, 60 Hz. In the waveform of the drive voltage B, when the time width of a rise time in which the voltage increases from the minimum value to the next maximum value is denoted by TrB, and the time width of a fall time in which the voltage decreases from the maximum value to the next minimum value is denoted by TfB, for example, the ratio TfB:TrB=8.5:1.5 is set in advance. In this case, the ratio of TfB to one period is called symmetry of the drive voltage B.

Figure 9C:
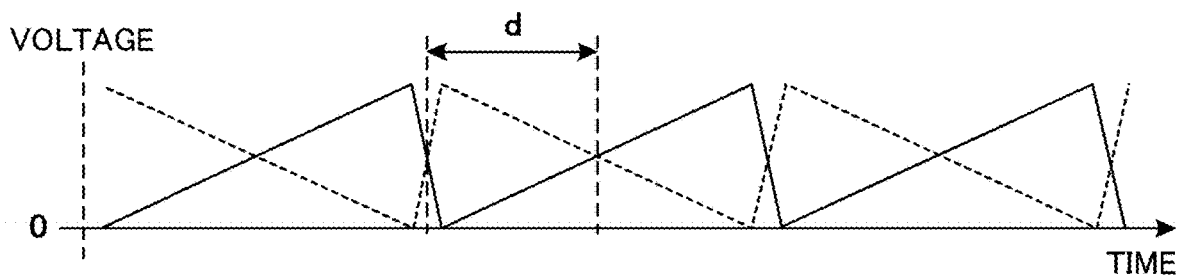
FIG. 9C illustrates an example in which the waveform of the drive voltage in FIG. 9A and the waveform of the drive voltage in FIG. 9B are superposed.

As illustrated in FIG. 9C, for example, a period TA of the waveform of the drive voltage A and a period TB of the waveform of the drive voltage B are set to be equal to each other. In this case, the drive voltage A and the drive voltage B have a phase difference d.

Note that the saw tooth waveform of the drive voltage A and the drive voltage B is, for example, generated by superposing sine waves. In addition, the frequency of the drive voltage A and the drive voltage B (drive frequency fs) is desirably a half-integer multiple of the lowest-order natural frequency (f(1)) of the light deflector 13. For example, the drive frequency fs is desirably any of a 1/5.5 multiple, a 1/6.5 multiple, and a 1/7.5 multiple of the lowest-order natural frequency f(1). Thus, it is possible to suppress oscillation due to harmonic components of the drive frequency fs as a result of setting the drive frequency to the half-integer multiple. Such oscillation that adversely affects optical scanning is called spurious oscillation.

Although the saw-tooth-wave drive voltage is used as the drive voltages A and B in this embodiment, the waveform is not limited to this and may be modified in accordance with device characteristics of the light deflector 13. For example, the drive voltage may have a waveform in which the crest of the saw tooth waveform is rounded or a waveform in which the linear region of the saw tooth waveform is curved. In such a case, the symmetry corresponds to the ratio of the rise time to one period or the ratio of the fall time to one period. Either the rise time or the fall time may be freely set as the reference.

Next, a method of optical scanning performed by the optical scanning apparatus 10 will be described with reference to FIG. 10.

Figure 10:
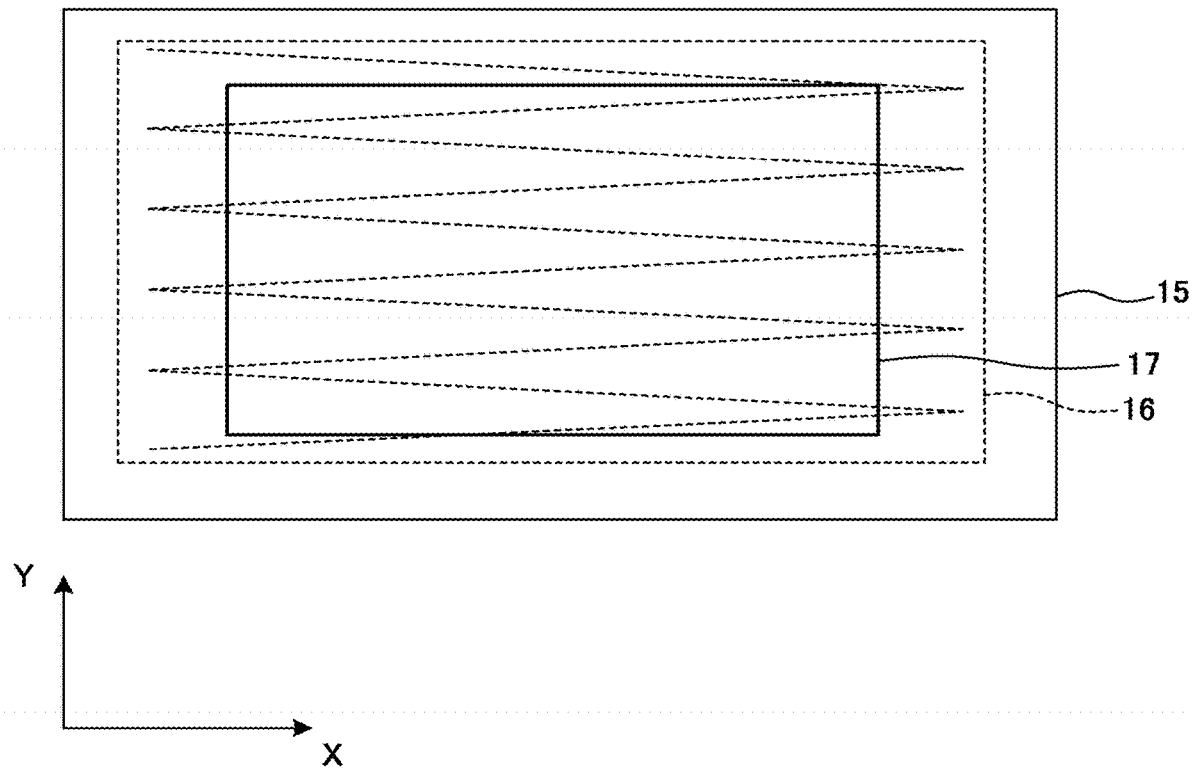
FIG. 10 is a diagram for describing optical scanning performed by the optical scanning apparatus.

FIG. 10 is a diagram for describing optical scanning performed by the optical scanning apparatus 10.

The optical scanning apparatus 10 deflects light from the light source apparatus 12 by using the light deflector 13 in two directions, which are the main scanning direction and the sub-scanning direction, and performs optical scanning on the scannable region 16 including the effective scan region 17 on the scan surface 15, as illustrated in FIG. 10. As described above, in the main scanning direction (hereinafter also referred to as "X-axis direction"), which is one of the two directions, optical scanning is performed on the reflection surface 14 of the light deflector 13 by using high-speed driving using resonance in accordance with a sine-wave drive signal; and in the sub-scanning direction (hereinafter also referred to as "Y-axis direction"), which is the other direction, optical scanning is performed on the reflection surface 14 of the light deflector 13 by using low-speed driving using non-resonance in accordance with a saw-tooth-wave drive signal. Such a drive method for optical scanning in which two-direction optical scanning is performed in a zigzag manner is called raster scan.

In the above drive method, it is desirable that optical scanning be performed at a constant speed in the sub-scanning direction (Y-axis direction) in the effective scan region 17. If the scanning speed in the sub-scanning direction is not constant (if the scanning speed in the sub-scanning direction varies), for example, at the time of projecting an image by using optical scanning, the projected image may be degraded by uneven brightness or blurring of the projected image, for example. For the constant scanning speed in the sub-scanning direction, it is desirable that the moving speed of the reflection surface 14 of the light deflector 13 around the second axis, that is, the temporal change of the oscillation angle of the reflection surface 14 around the second axis, be constant in the effective scan region 17.

Next, the temporal change of the oscillation angle of the reflection surface 14 of the light deflector 13 around the second axis and the change of the projected image as a result of the temporal change of the oscillation angle will be described with reference to FIGS. 11A to 11D.

Figure 11A:
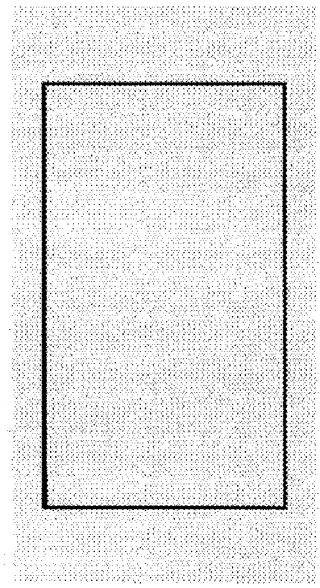
FIG. 11A illustrates a temporal change of an oscillation angle (optical scanning angle) of a reflection surface around a second axis in a case where moving speed of the reflection surface around the second axis is constant (uniform)

FIG. 11A illustrates the temporal change of the oscillation angle (optical scanning angle) of the reflection surface 14 around the second axis in a case where the moving speed of the reflection surface 14 around the second axis is constant (uniform).

Figure 11B:
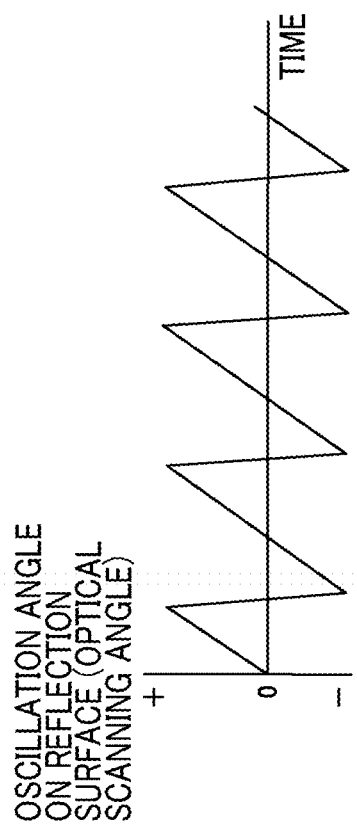
FIG. 11B illustrates a projected image in a case where the moving speed of the reflection surface around the second axis is constant (uniform)

FIG. 11B illustrates the projected image in a case where the moving speed of the reflection surface 14 around the second axis is constant (uniform).

Figure 11C:
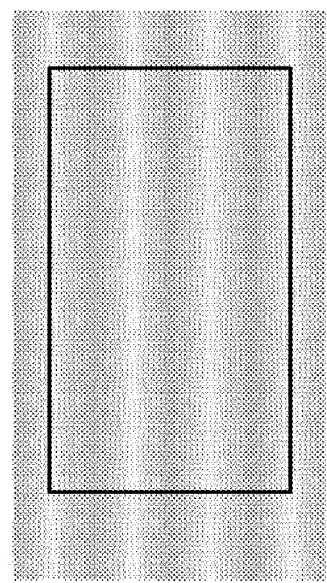
FIG. 11C illustrates a temporal change of the oscillation angle (optical scanning angle) of the reflection surface around the second axis in a case where the moving speed of the reflection surface around the second axis is not constant (not uniform)

FIG. 11C illustrates the temporal change of the oscillation angle (optical scanning angle) of the reflection surface 14 around the second axis in a case where the moving speed of the reflection surface 14 around the second axis is not constant (not uniform).

Figure 11D:
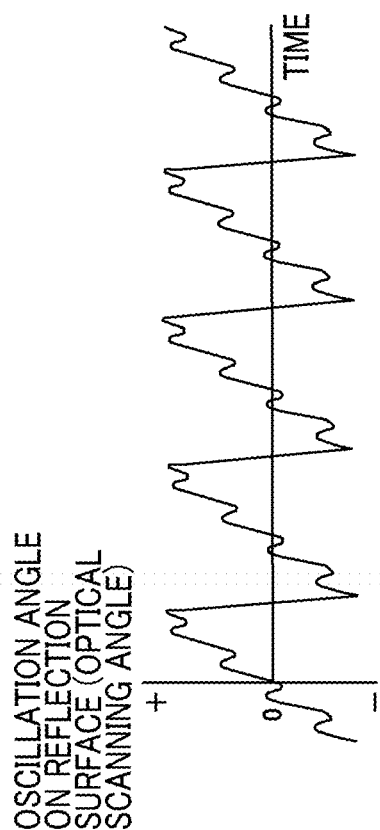
FIG. 11D illustrates a projected image in a case where the moving speed of the reflection surface around the second axis is not constant (not uniform)

FIG. 11D illustrates the projected image in a case where the moving speed of the reflection surface 14 around the second axis is not constant (not uniform).

Note that each of the projected images is an image obtained by the optical scanning apparatus 10 projecting, on the scan surface 15, a monochrome image that is set to have the same brightness on the entire surface.

It is desirable that the temporal change of the oscillation angle of the reflection surface 14 around the second axis, in other words, the moving speed of the reflection surface 14 around the second axis, be linear as illustrated in FIG. 11A. That is, it is desirable to drive the reflection surface 14 without generating variation (unevenness) in the moving speed of the reflection surface 14 around the second axis. In this case, it is possible to project an image such as the projected image in FIG. 11B without generating uneven brightness or scanning distortion. In order to realize such driving, in the driving of the reflection surface 14 around the second axis, relative phases or symmetries of between a drive voltage waveform A and a drive voltage waveform B are adjusted, and the spurious oscillation generated by, for example, resonance excitation of the light deflector 13 due to harmonic components contained in the saw-tooth-wave drive voltages is suppressed. For example, it is possible to offset oscillation generated by a harmonic component in the drive voltage waveform A and oscillation generated by a harmonic component in the drive voltage waveform B by adjusting the relative phase difference between the drive voltage waveform A and the drive voltage waveform B, and thereby, the spurious oscillation can be suppressed.

In addition, for example, the drive frequency fs and a symmetry S of the drive voltage waveform A and the drive voltage waveform B may be adjusted such that a natural frequency f(N) of the light deflector 13, which is an N-th frequency from the low-frequency side and for which excitation is wished to be suppressed, is included in the vicinity of a frequency fn (hereinafter referred to as "null frequency") obtained according to the first formula given below, and thereby, the spurious oscillation can be suppressed.

$$f_n = N \cdot \frac{f_s}{1-S} \qquad \text{Second Formula}$$

The following will describe the reasons why the spurious oscillation can be suppressed.

"Troughs (points corresponding to zero signal intensity to which signal intensity is reduced in theory)" are present at fixed intervals in a frequency spectrum (decomposed to frequency components through Fourier transformation of drive signal) of the saw-tooth-wave drive signal. In addition, in a frequency domain in the vicinity of the "troughs", the signal intensity is reduced. Each of the "troughs" is called null frequency, and the frequency domain in the vicinity of the "troughs" is called frequency reduced domain. The frequency domain in the vicinity of the "troughs" is, for example, a frequency domain in which the frequency is ±10% of the null frequency.

In this case, by adjusting the symmetry S such that the given natural frequency f(N) of the light deflector 13 is contained in the frequency reduced domain, excitation of natural oscillation can be suppressed, and the spurious oscillation on the reflection surface 14 can be suppressed. In this case, also, by adjusting the symmetry S such that the lowest-order natural frequency f(1) of the light deflector 13 is contained in the frequency reduced domain, the spurious oscillation can be suppressed most.

In addition, by adjusting the value of each drive voltage, the spurious oscillation can be suppressed more by adjusting the phase difference. Since the sensitivity of a piezoelectric drive portion with respect to the drive voltage differs depending on the design or manufacturing error, by adjusting the drive voltage, the magnitude of oscillation due to harmonic components generated in the drive voltage A and the drive voltage B can be made uniform, and the degree of offset can be increased.

As described above, by adjusting parameters of the drive signal, the spurious oscillation on the reflection surface 14 can be suppressed, and the uniformity of moving speed of the reflection surface 14 around the second axis can be maintained. However, the moving speed of the reflection surface 14 around the second axis actually varies, as illustrated in FIG. 11C, as a result of change of environmental temperature or change over time, and it is difficult to maintain the uniformity of moving speed. In this case, the density of scan lines in the sub-scanning direction (Y-axis direction) becomes high and low, and the brightness of a portion where the density of scan lines is high becomes relatively high and the brightness of a portion where the density of scan lines is low becomes relatively low. As a result, as illustrated in FIG. 11D, the projected image has uneven brightness in the sub-scanning direction (Y-axis direction).

In this embodiment, in a case where the brightness becomes uneven in the sub-scanning direction (Y-axis direction) due to the spurious oscillation on the reflection surface 14, the uneven brightness is detected, and the parameters of the drive signal are adjusted so as to suppress the spurious oscillation on the reflection surface 14, and thereby, the uneven brightness is suppressed.

The brightness becomes uneven in the sub-scanning direction because the density of scan lines in the sub-scanning direction becomes high and low. If the density of scan lines in the sub-scanning direction becomes high and low, in the light receiving surface (predetermined range) of the light receiver 18, intervals between positions of scan lines in the sub-scanning direction at which light is received are changed. This changes the number of times of light reception on the light receiving surface of the light receiver 18. For example, if the density of scan lines becomes low, intervals between positions of scan lines in the sub-scanning direction at which light is received on the light receiving surface of the light receiver 18 are increased, and thus, the number of times of light reception on the light receiving surface of the light receiver 18 is decreased. In contrast, if the density of scan lines becomes high, intervals between positions of scan lines in the sub-scanning direction at which light is received on the light receiving surface of the light receiver 18 are decreased, and thus, the number of times of light reception on the light receiving surface of the light receiver 18 is increased. Accordingly, based on the number of times of light reception of the light receiver 18 within a period T, which is substantially equal to the period of time in which a scan line moves on the light receiving surface of the light receiver 18 in the sub-scanning direction in a single scan on the scan surface 15 in the sub-scanning direction, it is possible to determine whether the density of scan lines becomes high and low in the sub-scanning direction.

From the above, the following can be found. If the uniformity of moving speed of the reflection surface 14 around the second axis is not maintained, as illustrated in FIG. 11C, the moving speed varies periodically in an oscillated manner when the oscillation angle of the reflection surface 14 changes from the most negative angle to the most positive angle. This is because the variation in the moving speed is caused by oscillation generated by excitation of the natural frequency of the light deflector 13 by harmonic components contained in the saw-tooth-wave drive voltages. There is a correlation between the period of such oscillation and the positions where the density of scan lines becomes high and low in the sub-scanning direction. Accordingly, the light receiver 18 can be provided at each of the positions where the density of scan lines becomes high and low obtained from the correlation.

At such positions where the density of scan lines becomes high and low, intervals between scan lines are changed largely depending on the magnitude (amplitude) of variation in the moving speed of the reflection surface 14 around the second axis. Accordingly, even if the magnitude (amplitude) of variation in the moving speed of the reflection surface 14 around the second axis is relatively small, intervals between scan lines are changed relatively largely. That is, the number of times of light reception of the light receiver 18 is changed more sensitively depending on the magnitude (amplitude) of variation in the moving speed of the reflection surface 14 around the second axis. Accordingly, in this embodiment, the light receiver 18 is provided such that the light receiving surface includes the positions where the density of scan lines becomes high in response to generation of variation in the moving speed of the reflection surface 14 around the second axis.

Specific examples will be described with reference to FIG. 12.

Figure 12:
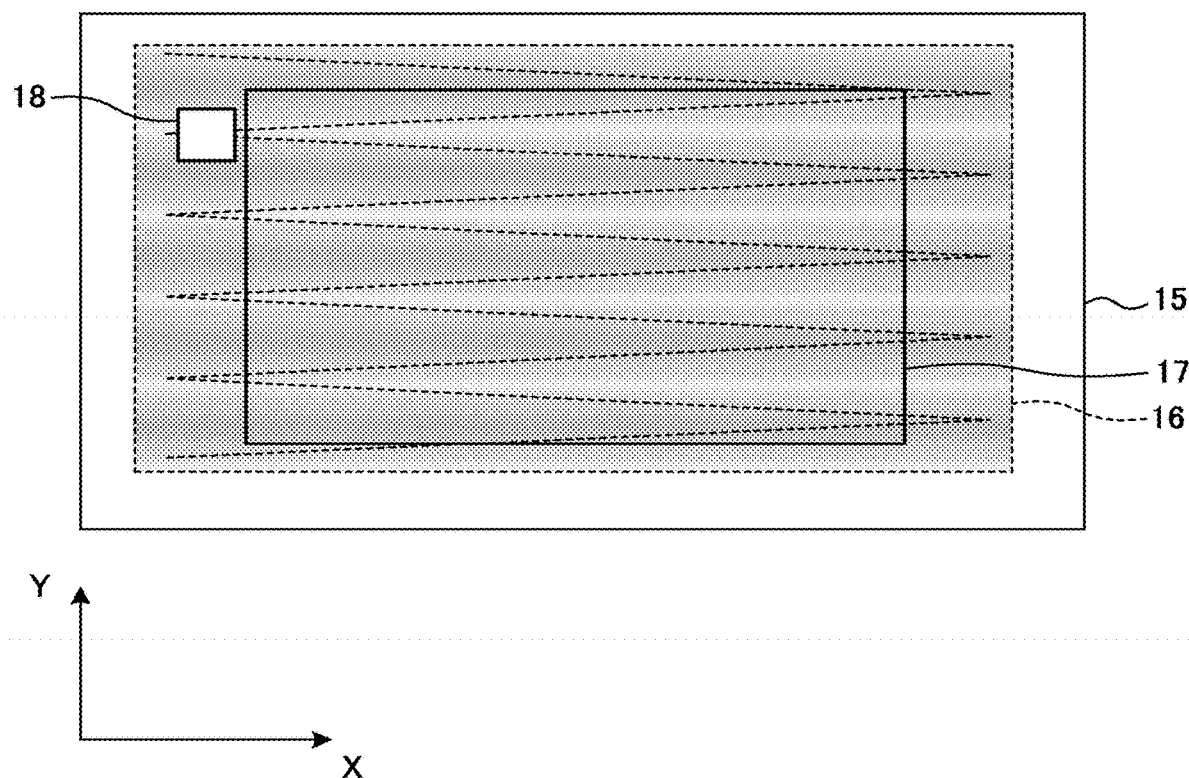
FIG. 12 illustrates an example in which the position of a light receiver is determined based on a natural frequency of the light deflector.

FIG. 12 illustrates an example in which the position of the light receiver 18 is determined based on the natural frequency of the light deflector 13.

When the natural frequency is denoted by the natural frequency f(N), a period Tm of uneven brightness in the sub-scanning direction (Y-axis direction) can be obtained according to the second formula given below. In this case, if the contribution ratio of oscillation caused by excitation of the lowest-order natural frequency f(1) is the largest, the following second formula can be approximated to Tm=1/f(1).

$$T_m = \frac{1}{f(N)} \ (N = 1, 2, 3, \dots) \quad \text{Second Formula}$$

The drive frequency fs of the drive voltages is set to 1/6.5 multiple, and the symmetry of the drive voltages are set as follows so that the lowest-order natural frequency f(1) of the light deflector 13 is contained in the frequency reduced domain: TrA:TfA=8.5:1, and TfB:TrB=8.5:1. In this case, the periodicity of uneven brightness (bright and dark bands) depends on the period of the lowest-order natural frequency f(1). That is, bright bands or dark bands appear in a period of a reciprocal of the lowest-order natural frequency f(1) with respect to the scannable region. Accordingly, the light receiver 18 is provided at a position that corresponds to an integer multiple of 1/f(1) from the scanning start point in the sub-scanning direction (Y-axis direction) of the scannable region.

In addition, in a case where the brightness becomes uneven, scanning distortion is also generated, which will be described later in detail. Thus, the scanning distortion can also be detected based on the uneven brightness.

Figure 13A:
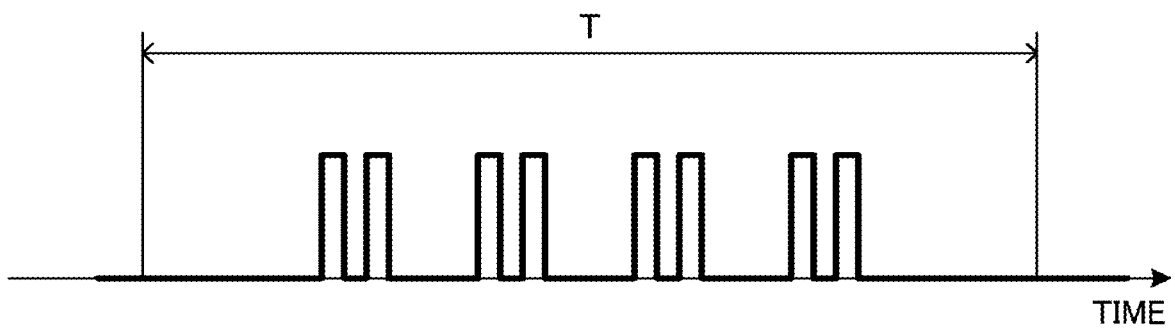
FIG. 13A illustrates a light reception signal of the light receiver in a case where the moving speed of the reflection surface around the second axis is constant (uniform)

FIG. 13A illustrates a light reception signal of the light receiver 18 in a case where the moving speed of the reflection surface 14 around the second axis is constant (uniform).

Figure 13B:
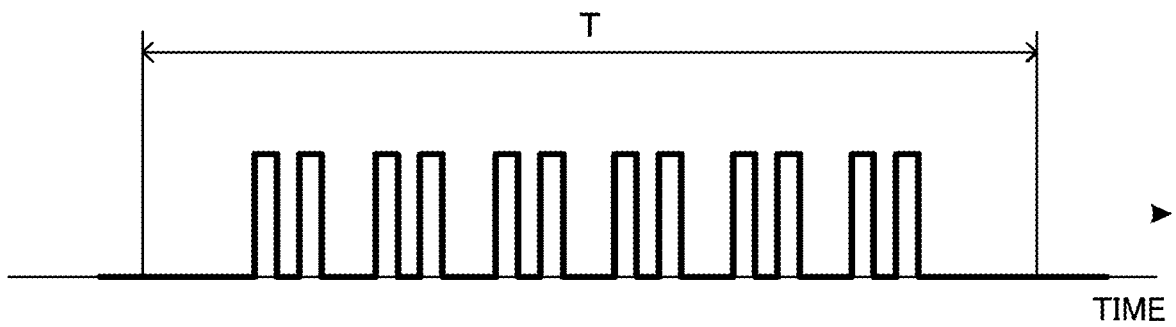
FIG. 13B illustrates a light reception signal of the light receiver in a case where the moving speed of the reflection surface around the second axis is not constant (not uniform)

FIG. 13B illustrates a light reception signal of the light receiver 18 in a case where the moving speed of the reflection surface 14 around the second axis is not constant (not uniform).

As illustrated in FIG. 13A, in a case where the moving speed of the reflection surface 14 around the second axis is constant (uniform), in this embodiment, scan lines corresponding to four reciprocations (eight scan lines) move on the light receiving surface of the light receiver 18. Thus, the number of times of light reception of the light receiver 18 is eight. On the other hand, in a case where the moving speed of the reflection surface 14 around the second axis varies as a result of change of environmental temperature or change over time, the density of scan lines in the sub-scanning direction becomes high and low. At the position where the light receiver 18 is provided in this embodiment, the density of scan lines becomes high. As a result, the number of scan lines that move on the light receiving surface of the light receiver 18 is increased (twelve scan lines in the example in FIG. 13B), and the number of times of light reception of the light receiver 18 is twelve.

In the following case, the light receiver 18 is provided such that the light receiving surface includes the position where the density of scan lines becomes low when the moving speed of the reflection surface 14 around the second axis varies. This case will be described below.

Figure 14A:
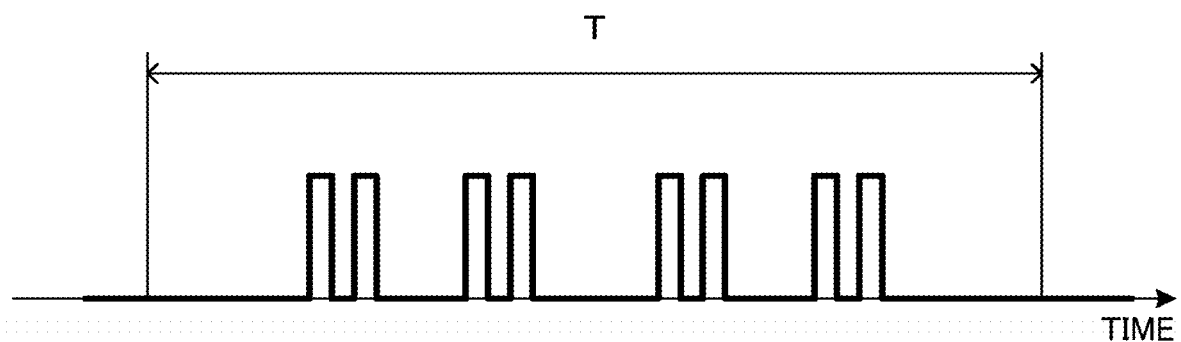
FIG. 14A illustrates the light reception signal of the light receiver in a case where the moving speed of the reflection surface around the second axis is constant (uniform)

FIG. 14A illustrates the light reception signal of the light receiver 18 in a case where the moving speed of the reflection surface 14 around the second axis is constant (uniform).

Figure 14B:
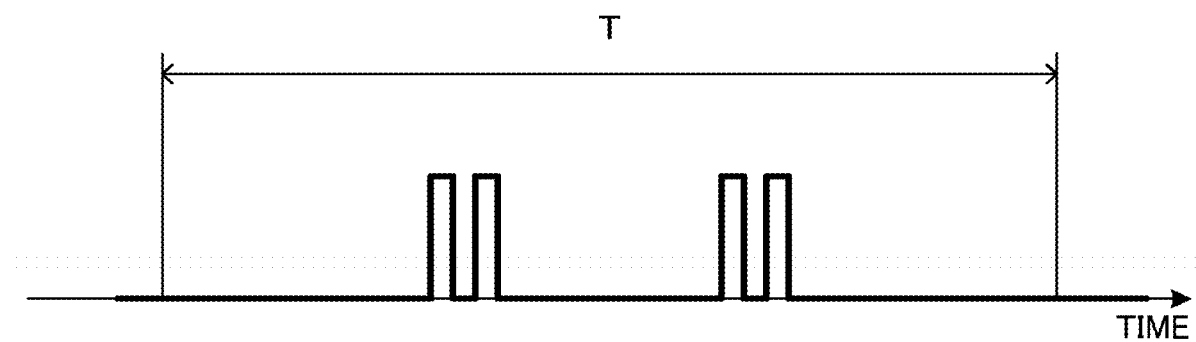
FIG. 14B illustrates another example of the light reception signal of the light receiver in a case where the moving speed of the reflection surface around the second axis is not constant (not uniform)

FIG. 14B illustrates another example of the light reception signal of the light receiver 18 in a case where the moving speed of the reflection surface 14 around the second axis is not constant (not uniform).

As illustrated in FIG. 14A, in a case where the moving speed of the reflection surface 14 around the second axis is constant (uniform), in this embodiment, scan lines corresponding to four reciprocations (eight scan lines) move on the light receiving surface of the light receiver 18. Thus, the number of times of light reception of the light receiver 18 is eight. On the other hand, in a case where the moving speed of the reflection surface 14 around the second axis varies as a result of change of environmental temperature or change over time, the density of scan lines in the sub-scanning direction becomes high and low, and becomes low in the example in FIG. 14B. As a result, the number of scan lines that move on the light receiving surface of the light receiver 18 is decreased (four scan lines in the example in FIG. 14B), and the number of times of light reception of the light receiver 18 is four.

Next, a process for adjusting the drive signal in accordance with light reception signals will be described with reference to FIG. 15.

Figure 15:
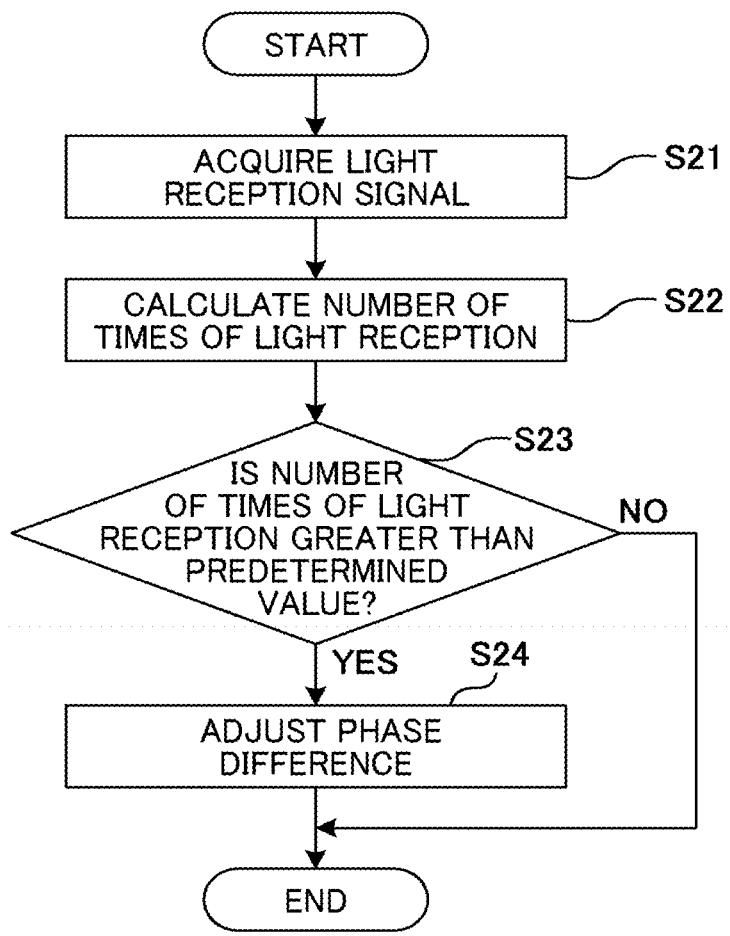
FIG. 15 is a flowchart of a process for adjusting a drive signal in the embodiment.

FIG. 15 is a flowchart of the process for adjusting the drive signal in this embodiment.

The process for adjusting the drive signal is performed by the controller 30 in the control apparatus 11 illustrated in FIG. 3. As illustrated in FIG. 15, in step S21, the controller 30 acquires a light reception signal from the light receiver 18.

In step S22, the controller 30 calculates the number of times of light reception from acquired light reception signals. Note that the number of times of light reception is calculated by measuring the number of times an H-level signal representing reception of light is detected during the period T, which is substantially equal to the period of time in which a scan line moves on the light receiving surface of the light receiver 18 in the sub-scanning direction in a single scan on the scan surface 15 in the sub-scanning direction.

In step S23, the controller 30 determines whether the number of times of light reception calculated in step S22 is greater than a predetermined value (predetermined number of times). If it is determined that the number of times of light reception is greater than the predetermined value, the process proceeds to step S24; if it is determined that the number of times of light reception is less than or equal to the predetermined value, the process ends.

In step S24, the controller 30 adjusts the phase difference between the drive voltage A and the drive voltage B. The amount of the phase difference to be adjusted (phase adjustment amount) is a predetermined amount. Note that the phase adjustment amount of the drive voltage A and the drive voltage B may be calculated based on the number of times of light reception calculated in step S22. In addition, the phase adjustment amount based on the predetermined number of times of light reception may be stored in the form of a data table, and the phase adjustment amount may be calculated by using the data table, or the phase adjustment amount may be calculated from the number of times of light reception according to a predetermined formula. Furthermore, temperature information may be acquired from an external temperature sensor, and the phase adjustment amount may be set based on the temperature information, or the number of times of adjustment may be counted, and the predetermined amount based on the counted number may be changed.

As described above, in this embodiment, based on the number of times of light reception of the light receiver 18 within the period T, which is substantially equal to the period of time in which a scan line moves on the light receiving surface of the light receiver 18 in the sub-scanning direction in a single scan on the scan surface 15 in the sub-scanning direction, the drive signal is adjusted. Thus, it is possible to detect variation in the moving speed around the second axis as a result of change of environmental temperature or change over time, to adjust the drive signal so that the uniformity of moving speed can be maintained, and to improve the high and low density of scan lines in the sub-scanning direction, and thereby uneven brightness can be suppressed.

Figure 16:
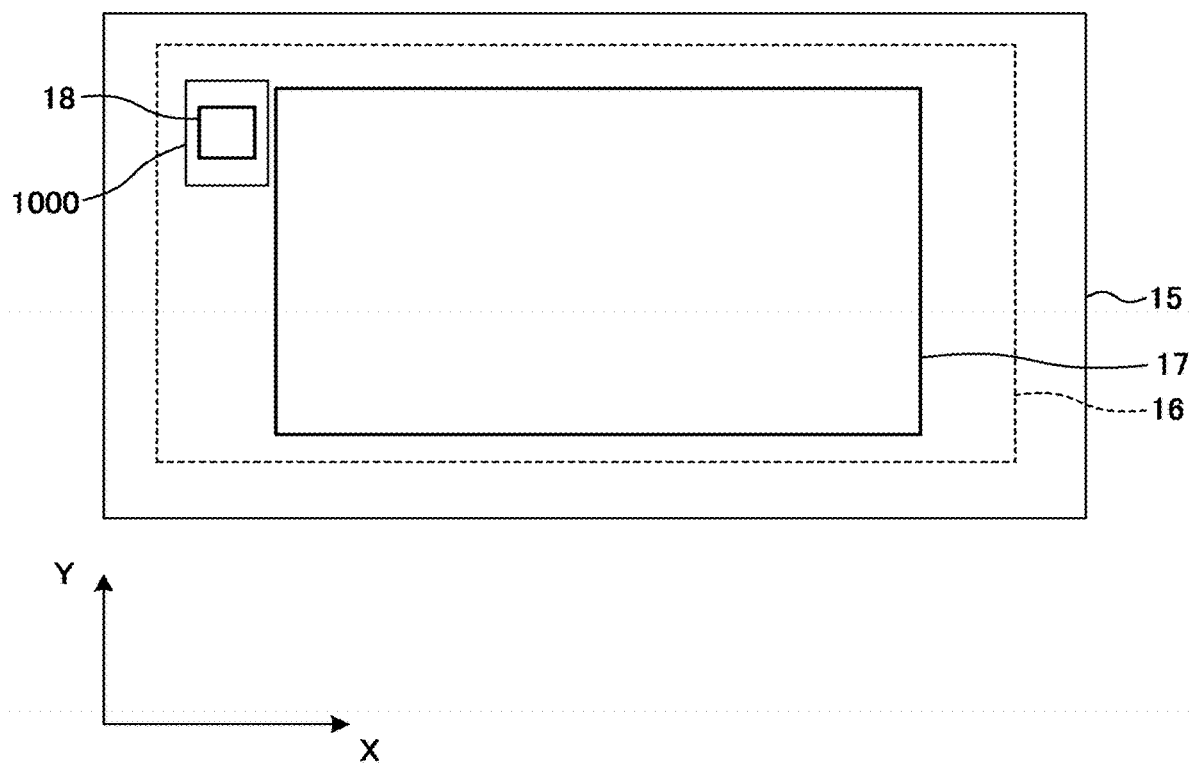
FIG. 16 illustrates a detection image.

When adjusting the drive signal, optical scanning is performed such that light is incident on the light receiver 18. Accordingly, for example, as illustrated in FIG. 16, the control apparatus 11 controls the light source apparatus 12 and the light deflector 13 in such a manner that a detection image 1000 that has been stored in advance is projected onto the light receiving surface of the light receiver 18. The detection image 1000 may be projected onto the entire light receiving surface of the light receiver 18 outside the effective scan region 17. Thus, it is possible to adjust the drive signal without letting a user recognize the detection image 1000. In addition, the detection image 1000 may be projected in as small a region as possible other than the light receiving surface of the light receiver 18. Thus, light emitted from the light source can be saved, and an increase in temperature can be suppressed and energy can be saved.

Although this embodiment has described a case in which the phase of each drive signal is adjusted based on the number of times of light reception, it is also possible to adjust the symmetry or voltage value of the drive signal based on the number of times of light reception. In such a case, "ADJUST PHASE" in step S24 in the adjustment process in FIG. 15 is replaced with "ADJUST SYMMETRY" or "ADJUST VOLTAGE VALUE".

When adjusting the phase or symmetry, it is possible to adjust either the drive voltage A or the drive voltage B, having a larger ratio of the rise time to one period. This is because an abrupt rise immediately after adjustment may generate spurious oscillation. In addition, when adjusting the voltage value, it is possible to adjust either the drive voltage A or the drive voltage B, having a smaller ratio of the rise time to one period. This is because an abrupt rise increases the sensitivity of the piezoelectric drive portion, and the adjustment amount does not have to be a large amount.

Furthermore, this embodiment has illustrated an example in which the number of times of light reception of the light receiver 18 is used for determining that the density of scan lines in the sub-scanning direction has become high and low. However, it is also possible to use, for the determination, a time difference between light reception timings at which scan light is received at the most distant two positions in the sub-scanning direction on the light receiving surface (within a predetermined range) of the light receiver 18.

Figure 17A:
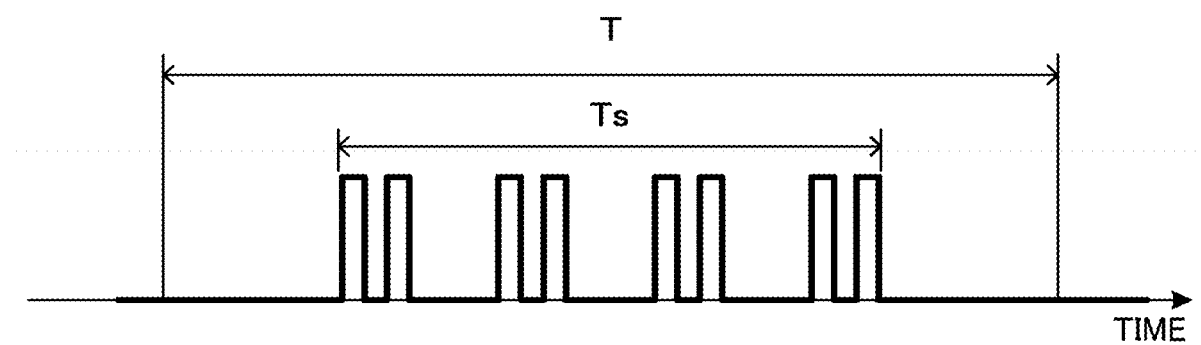
FIG. 17A illustrates a light reception signal of the light receiver in a case where the moving speed of the reflection surface around the second axis is constant (uniform)

FIG. 17A illustrates a light reception signal of the light receiver 18 in a case where the moving speed of the reflection surface 14 around the second axis is constant (uniform).

Figure 17B:
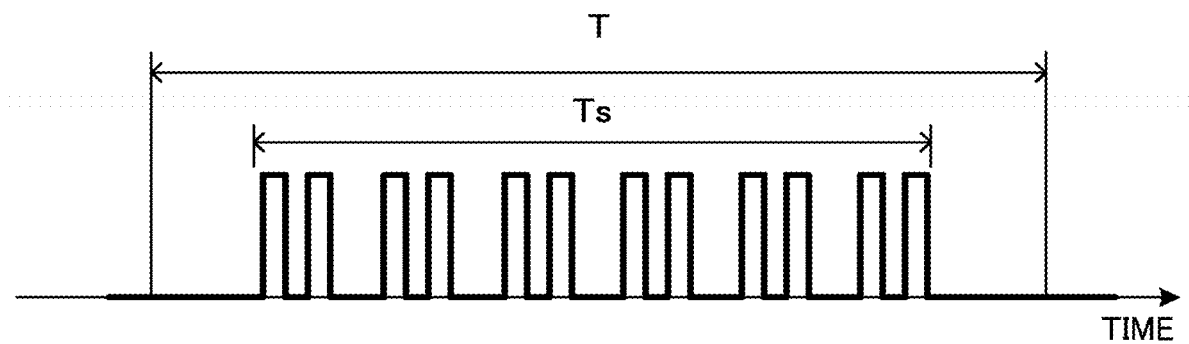
FIG. 17B illustrates a light reception signal of the light receiver in a case where the moving speed of the reflection surface around the second axis is not constant (not uniform)

FIG. 17B illustrates a light reception signal of the light receiver 18 in a case where the moving speed of the reflection surface 14 around the second axis is not constant (not uniform).

As illustrated in FIG. 17A, in a case where the moving speed of the reflection surface 14 around the second axis is constant (uniform), in this embodiment, scan lines corresponding to four reciprocations (eight scan lines) move on the light receiving surface of the light receiver 18. Thus, the number of times of light reception of the light receiver 18 is eight. On the other hand, in a case where the moving speed of the reflection surface 14 around the second axis varies as a result of change of environmental temperature or change over time, the density of scan lines in the sub-scanning direction becomes high and low. At the position where the light receiver 18 is provided in this embodiment, the density of scan lines becomes high. Thus, the number of times of light reception of the light receiver 18 is twelve.

In this case, a time difference Ts between a first-detected H-level signal and a last-detected H-level signal among light reception signals is increased as the number of times of light reception of the light receiver 18 is increased. Thus, instead of the number of times of light reception, the time difference Ts may be used for performing substantially the same process as that in this embodiment.

Figure 18:
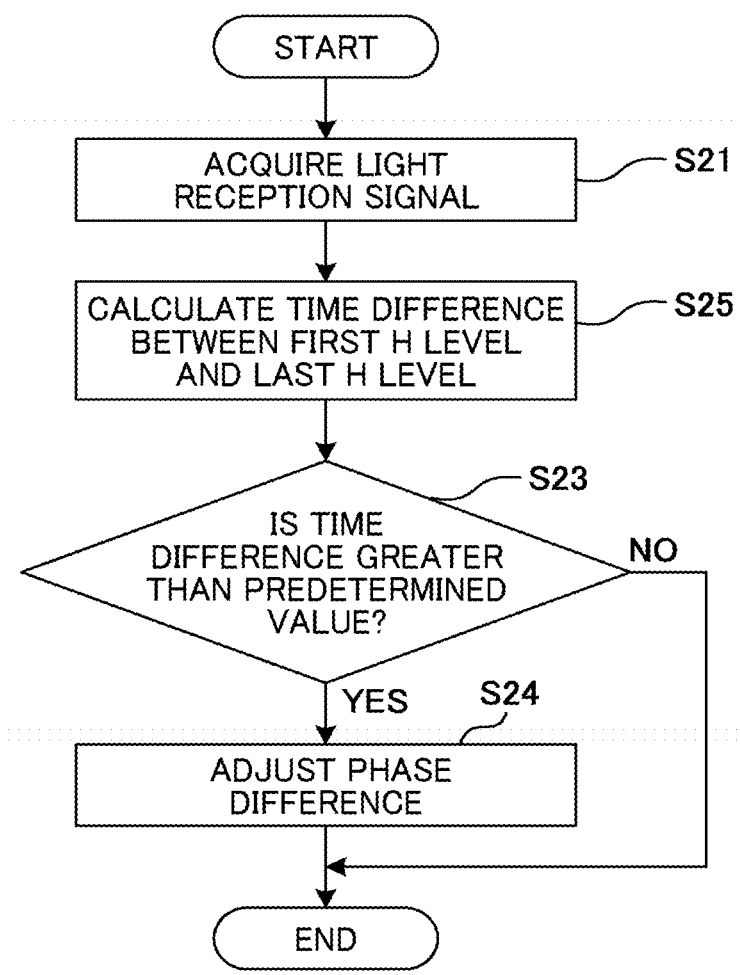
FIG. 18 is a flowchart of another example of the process for adjusting the drive signal in the embodiment.

FIG. 18 is a flowchart of the process for adjusting the drive signal in a case where the time difference Ts is used instead of the number of times of light reception.

As illustrated in FIG. 18, in step S21, the controller 30 acquires a light reception signal from the light receiver 18. In step S22, the controller 30 calculates the time difference Ts between the first-detected H-level signal and the last-detected H-level signal among acquired light reception signals.

In step S23, the controller 30 determines whether the time difference Ts calculated in step S22 is greater than a predetermined value (predetermined time). If it is determined that the time difference Ts is greater than the predetermined value, the process proceeds to step S24; if it is determined that the time difference Ts is less than or equal to the predetermined value, the adjustment process ends.

In step S24, the controller 30 adjusts the phase difference between the drive voltage A and the drive voltage B. The amount of the phase difference to be adjusted (phase adjustment amount) is a predetermined amount. Note that the phase adjustment amount of the drive voltage A and the drive voltage B may be calculated based on the time difference Ts calculated in step S22. In addition, the phase adjustment amount based on the predetermined time difference Ts may be stored in the form of a data table, and the phase adjustment amount may be calculated by using the data table, or the phase adjustment amount may be calculated from the time difference Ts according to a predetermined formula. Furthermore, temperature information may be acquired from an external temperature sensor, and the phase adjustment amount may be set based on the temperature information, or the number of times of adjustment may be counted, and the predetermined amount based on the counted number may be changed.

Figure 19A:
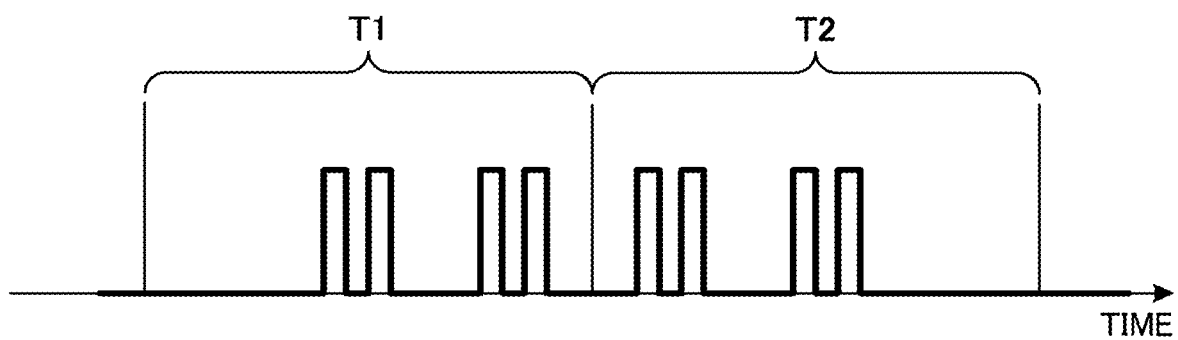
FIG. 19A illustrates the light reception signal of the light receiver in a case where the moving speed of the reflection surface around the second axis is constant (uniform)
Figure 19B:
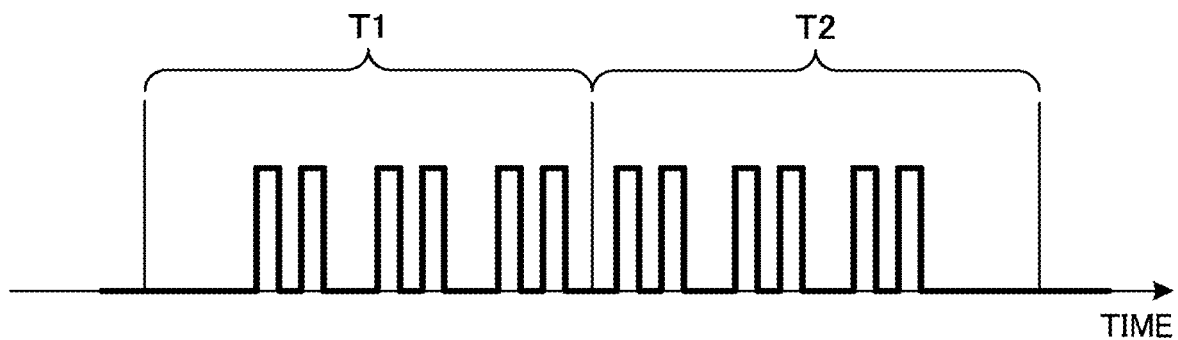
FIG. 19B illustrates a still another example of the light reception signal of the light receiver in a case where the moving speed of the reflection surface around the second axis is not constant (not uniform)

This embodiment has illustrated an example in which the high and low density of scan lines in the sub-scanning direction is detected based on the number of times of light reception at a plurality of positions in the sub-scanning direction during a single scan (one frame) on the scan surface 15 in the sub-scanning direction. However, the present disclosure is not limited to this example. For example, as illustrated in FIGS. 19A and 19B, the number of times of light reception during a first period T1 of the period T in this embodiment may be detected in a first frame, and the number of times of light reception during a second period T2 may be detected in a second frame. In this manner, the number of times of light reception at the plurality of positions in the sub-scanning direction may be separately detected in a plurality of frames. In this case, by using the total number of times of light reception detected in the plurality of frames, the high and low density of scan lines in the sub-scanning direction may be detected.

By detecting the number of times of light reception at the plurality of positions in the sub-scanning direction separately in the plurality of frames, a projection region of the detection image 1000 in each frame can be narrowed down (in the example in FIGS. 19A and 19B, the region may be half of the light receiving surface of the light receiver 18). Thus, the time of light emission of the light source in one frame can be shortened, and an increase in temperature can be suppressed.

The same applies to a case where the high and low density of scan lines in the sub-scanning direction is detected based on the time difference Ts between light reception timings at the most distant two positions among the plurality of positions in the sub-scanning direction. That is, the light reception timings at the most distant two positions may be detected in different frames.

In addition, in this embodiment, the single light receiver 18 (light receiver having the single light receiving surface) is used for detecting the number of times of light reception at the plurality of positions in the sub-scanning direction or the time difference Ts between light reception timings at the most distant two positions. However, a plurality of light receivers may also be used. In this case, the number of times of light reception at the plurality of positions in the sub-scanning direction is detected separately by the plurality of light receivers, and by using the total number of times of light reception detected by the plurality of light receivers, the high and low density of scan lines in the sub-scanning direction may be detected.

The same applies to a case where the high and low density of scan lines in the sub-scanning direction is detected based on the time difference Ts between light reception timings at the most distant two positions among the plurality of positions in the sub-scanning direction. That is, the light reception timing at the most distant two positions may be detected by different light receivers.

Second Embodiment

Next, an image projecting apparatus in which the optical scanning apparatus 10 according to the first embodiment is applied will be described in detail with reference to FIGS. 20 and 21.

The image projecting apparatus is an apparatus that performs optical scanning to project an image and is, for example, a head-up display.

Figure 20:
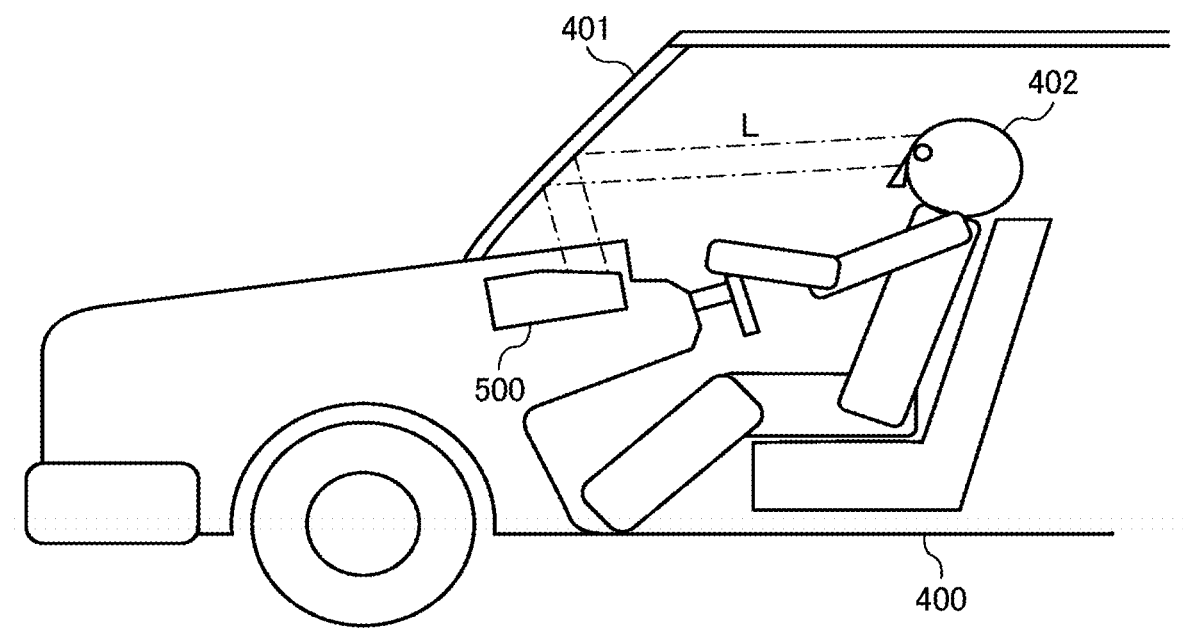
FIG. 20 schematically illustrates an automobile in which a head-up display is incorporated.

FIG. 20 schematically illustrates an embodiment of an automobile 400 in which a head-up display 500, which is the image projecting apparatus, is incorporated.

Figure 21:
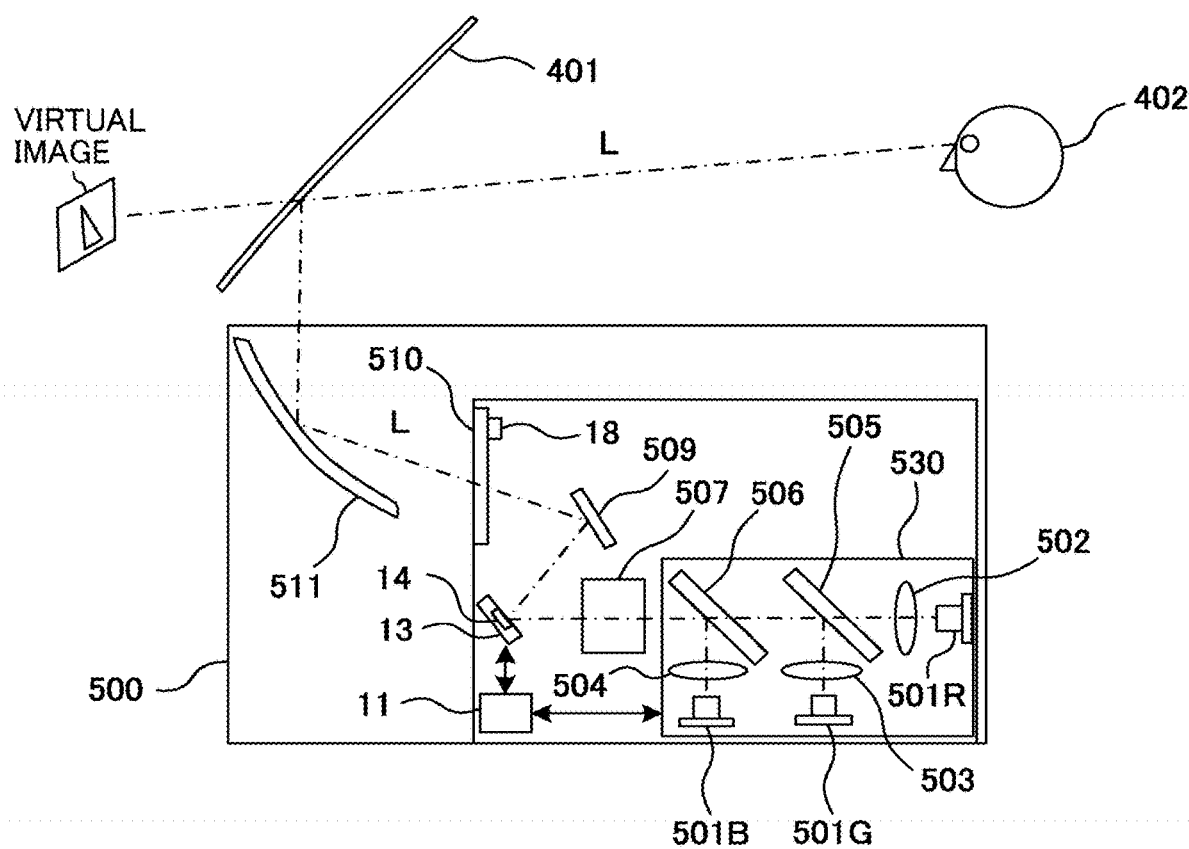
FIG. 21 schematically illustrates a configuration of the head-up display.

FIG. 21 schematically illustrates a configuration of the head-up display 500.

As illustrated in FIG. 20, the head-up display 500 is provided, for example, near a windshield (e.g., a windshield 401) of the automobile 400. Projected light L that is emitted from the head-up display 500 reflects on the windshield 401 and travels toward an observer (a driver 402) who is a user. Thus, the driver 402 can view, for example, an image projected by the head-up display 500 as a virtual image. Note that a combiner may be provided on the inner wall of the windshield 401, and the user may view a virtual image by using projected light that reflects on the combiner.

As illustrated in FIG. 21, the head-up display 500 emits laser light from red, green, and blue lasers 501R, 501G, and 501B. The emitted laser light travels through an incident optical system and is then deflected by the light deflector 13 having the reflection surface 14. The incident optical system includes collimator lenses 502, 503, and 504, which are provided for the respective lasers, two dichroic mirrors 505 and 506, and a light amount adjusting section 507.

The deflected laser light travels through a projection optical system and is then projected. The projection optical system includes a free-form surface mirror 509, an intermediate screen 510, and a projection mirror 511. The light receiver 18 is provided on the intermediate screen 510, and the optical scanning apparatus 10 is adjusted by using a light reception signal from the light receiver 18.

Note that in the head-up display 500, the lasers 501R, 501G, and 501B, the collimator lenses 502, 503, and 504, and the dichroic mirrors 505 and 506 are formed as a unit, which is a light source unit 530, in an optical housing.

The head-up display 500 projects an intermediate image that is displayed on the intermediate screen 510, on the windshield 401 of the automobile 400, thereby allowing the driver 402 to view the intermediate image as a virtual image.

The laser beams of the respective colors emitted from the lasers 501R, 501G, and 501B are formed as substantially parallel beams through the collimator lenses 502, 503, and 504 and are combined by the two dichroic mirrors 505 and 506. The light amount of the combined laser beams is adjusted by the light amount adjusting section 507, and then two-dimensional scanning is performed by the light deflector 13 having the reflection surface 14. The projected light L that is used for the two-dimensional scanning performed by the light deflector 13 reflects on the free-form surface mirror 509 so that distortion is corrected, and is then condensed to the intermediate screen 510 to display the intermediate image. The intermediate screen 510 is constituted by a microlens array on which microlenses are two-dimensionally arrayed, and expands the projected light L that enters the intermediate screen 510 in units of microlens.

The light deflector 13 moves the reflection surface 14 biaxially in a reciprocal manner to perform two-dimensional scanning by using the projected light L that enters the reflection surface 14. The driving of the light deflector 13 is controlled in synchronization with the light-emitting timing of the lasers 501R, 501G, and 501B.

Although the head-up display 500 as an example of the image projecting apparatus has been described above, the image projecting apparatus may be any apparatus that performs optical scanning by using the light deflector 13 having the reflection surface 14 to project an image.

For example, the present disclosure is also applicable to a projector that projects an image on a display screen, a head-mounted display that is incorporated in a wearable member on the head of the observer, for example, and that projects an image on a transflective screen of the wearable member or on an eye ball as a screen, and the like.

In addition, the image projecting apparatus may be incorporated in, not only a vehicle or the wearable member, but also, for example, a mobile object such as an aircraft, a vessel, or a moving robot, and a non-mobile object such as an operation robot that operates a driving target such as a manipulator without moving from the installed location.

Third Embodiment

Next, an optical writing apparatus to which the optical scanning apparatus 10 according to the first embodiment is applied will be described in detail with reference to FIGS. 22 and 23.

Figure 22:
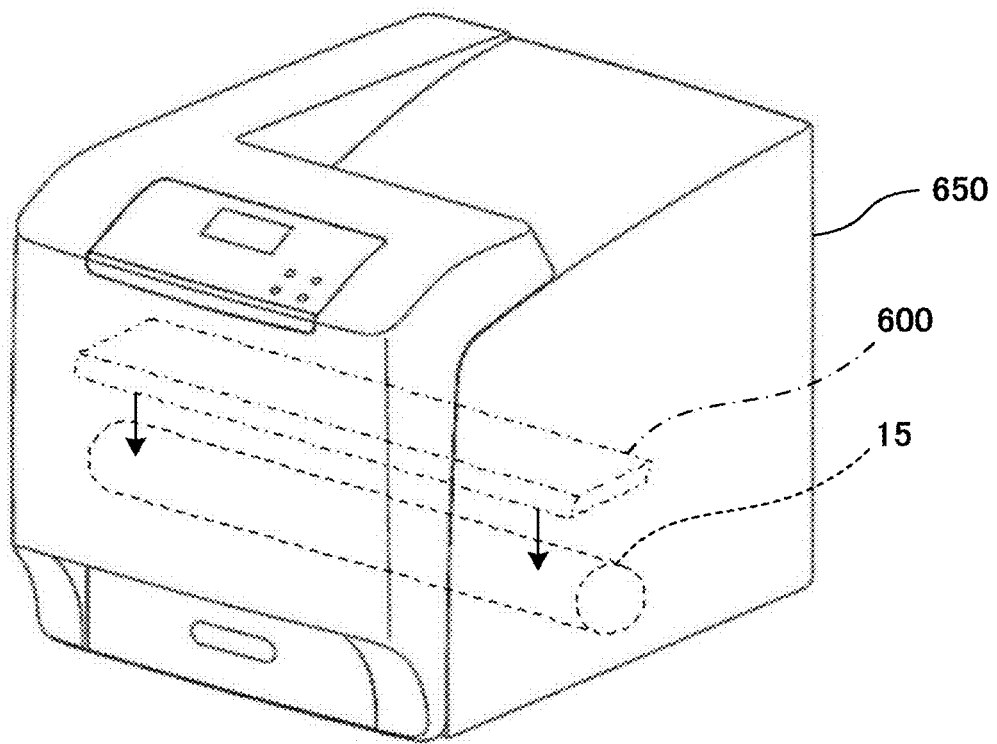
FIG. 22 schematically illustrates an image forming apparatus in which an optical writing apparatus is incorporated.

FIG. 22 schematically illustrates an image forming apparatus in which an optical writing apparatus 600 is incorporated.

Figure 23:
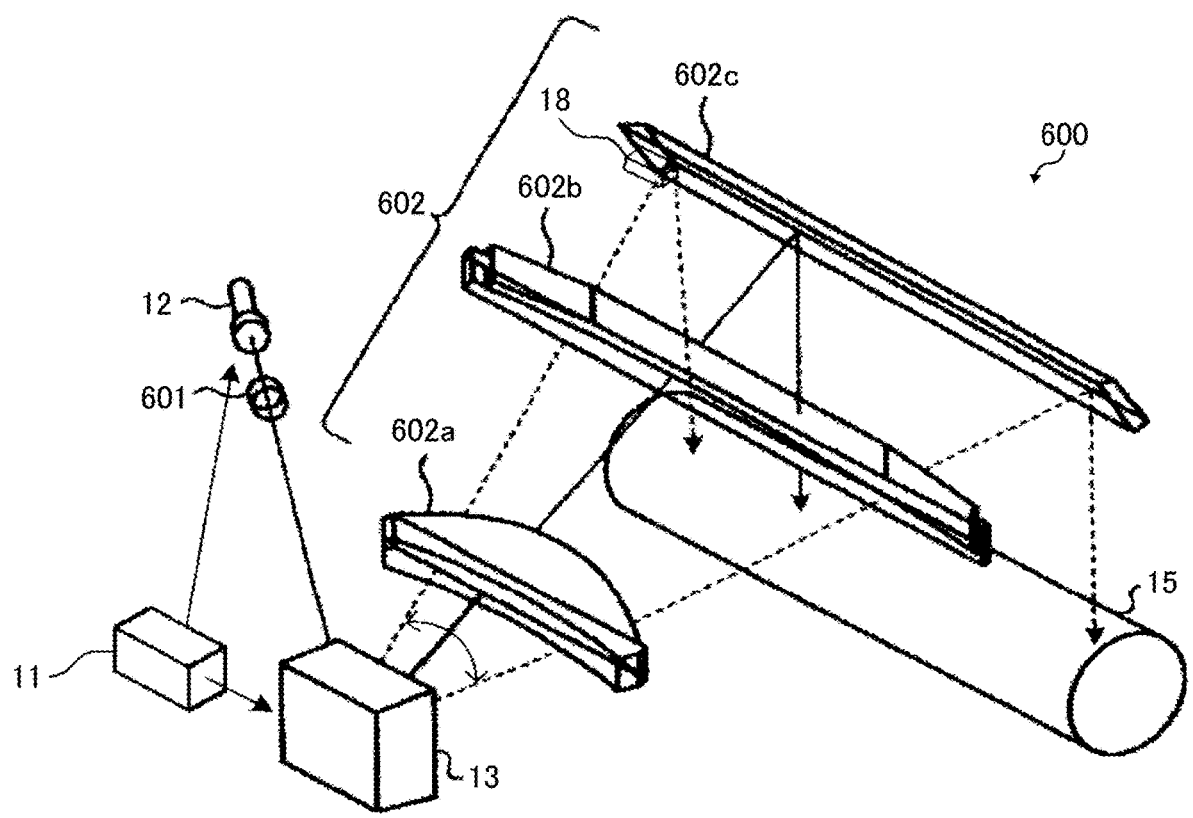
FIG. 23 schematically illustrates a configuration of the optical writing apparatus.

FIG. 23 schematically illustrates a configuration of the optical writing apparatus 600.

As illustrated in FIG. 22, the optical writing apparatus 600 is used as a component of an image forming apparatus typified by a laser printer 650, for example, having printer functions using laser light. In the image forming apparatus, the optical writing apparatus 600 performs optical scanning on a photoconductor drum, which is the scan surface 15, by using one or more laser beams, thereby performing optical writing on the photoconductor drum.

As illustrated in FIG. 23, in the optical writing apparatus 600, the laser light from the light source apparatus 12 such as a laser element travels through an image forming optical system 601 such as a collimator lens and is then deflected monoaxially or biaxially by the light deflector 13 having the reflection surface 14.

The laser light deflected by the light deflector 13 travels through a scanning optical system 602 constituted by a first lens 602a, a second lens 602b, and a reflective mirror section 602c, and is emitted onto the scan surface 15 (e.g., photoconductor drum or photoconductor sheet), and thereby optical writing is performed. The scanning optical system 602 forms a light beam in the form of a spot on the scan surface 15. At this time, the light receiver 18 is provided in the scanning optical system 602, which is also a surface to be scanned by the light deflector 13.

In the above manner, the optical writing apparatus 600 can be used as a component of the image forming apparatus having a printer function using laser light.

In addition, the optical writing apparatus 600 can also be used as a component of an image forming apparatus such as a laser label apparatus that deflects laser light to perform optical scanning on thermal media and print letters by heating.

The light deflector 13 having the reflection surface 14 to be applied to the optical writing apparatus is advantageous in saving power of the optical writing apparatus because power consumption for driving the light deflector 13 is less than that for driving a polygon mirror, for example.

In addition, the wind noise at the time of oscillation of the light deflector 13 is weaker than that of a polygon mirror, and thus, the light deflector 13 is advantageous in improving the silence of the optical writing apparatus. Furthermore, the optical writing apparatus can be installed in a much smaller space than the polygon mirror, and the heat generation amount of the light deflector 13 is small. Thus, the light deflector 13 can be easily made compact, which is advantageous in making the image forming apparatus compact.

Fourth Embodiment

Next, an object recognizing apparatus to which the optical scanning apparatus 10 according to the first embodiment is applied will be described in detail with reference to FIGS. 24 and 25.

The object recognizing apparatus is an apparatus that recognizes an object in a target direction and is a laser radar, for example.

Figure 24:
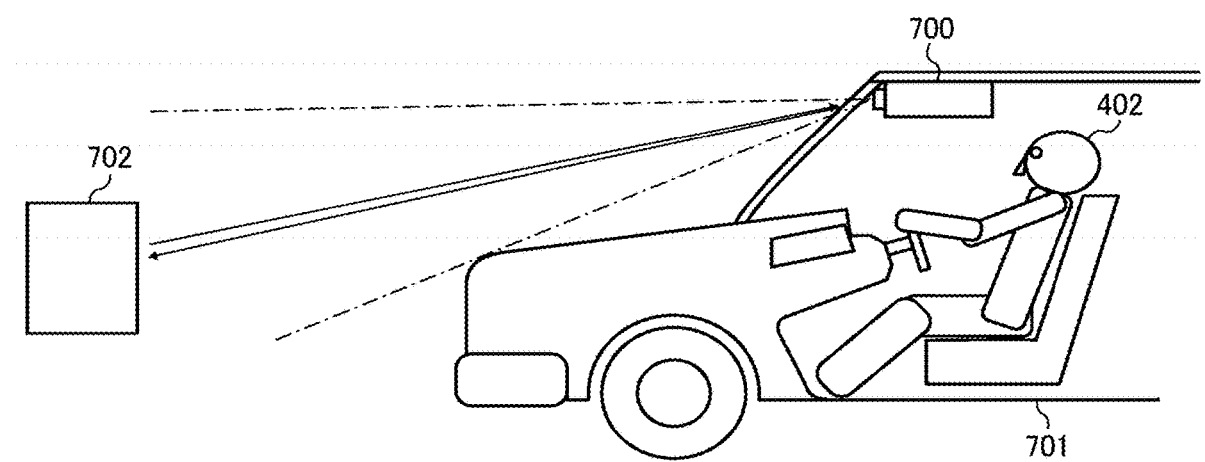
FIG. 24 schematically illustrates an automobile in which a laser radar is incorporated.

FIG. 24 schematically illustrates an automobile in which the laser radar that is an object recognizing apparatus is incorporated.

Figure 25:
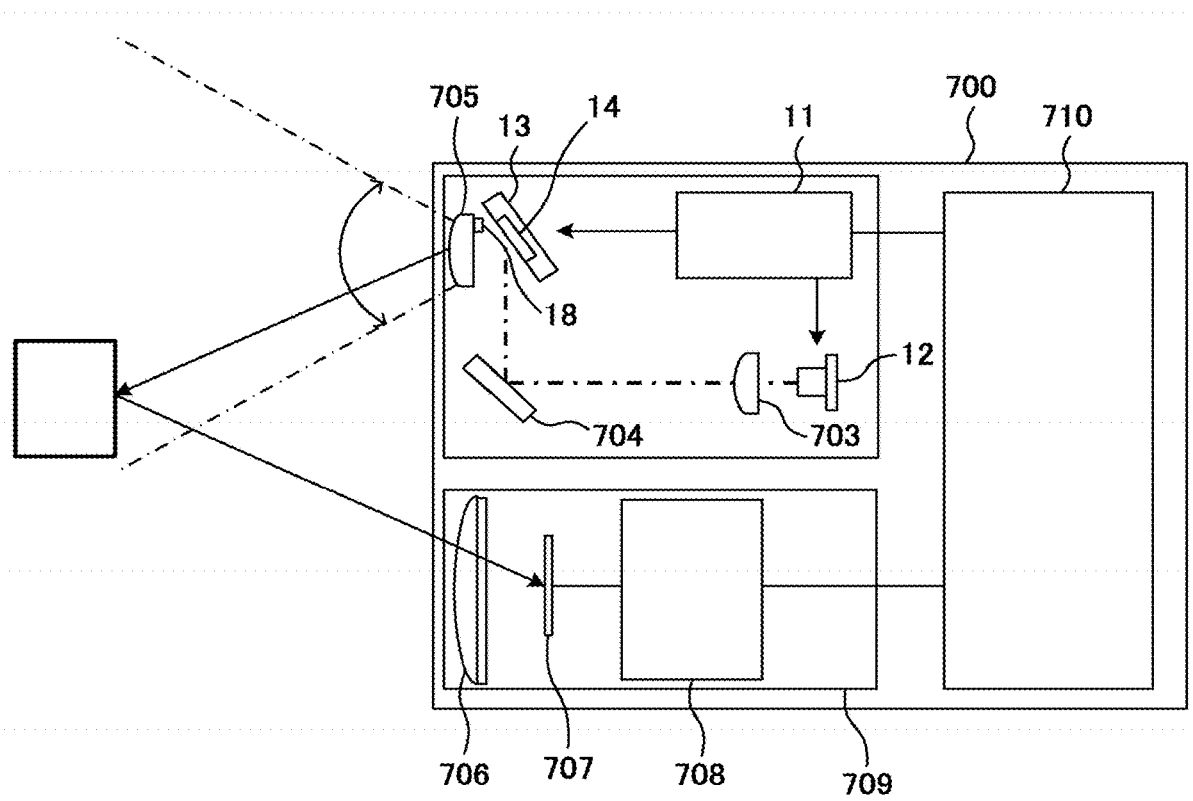
FIG. 25 schematically illustrates a configuration of the laser radar.

FIG. 25 schematically illustrates a configuration of the laser radar.

As illustrated in FIG. 24, a laser radar 700 is incorporated in an automobile 701, for example, and performs optical scanning in a target direction and receives light reflected on an object 702 that is present in the target direction, thereby recognizing the object 702.

As illustrated in FIG. 25, laser light emitted from the light source apparatus 12 travels through an incident optical system constituted by a collimator lens 703, which is an optical system making divergent light into substantially parallel beams, and a planar mirror 704, and is then used for scanning performed monoaxially or biaxially by the light deflector 13 having the reflection surface 14. Then, the laser light is emitted through a projection lens 705, for example, which is a projection optical system, to the object 702 that is ahead of the automobile 701. The light receiver 18 is provided on the projection lens 705, which is also a surface to be scanned.

The light reflected on the object 702 is detected by a photodetector 709. Specifically, the reflected light travels through a condenser lens 706, for example, which is a reception optical system, and is received by an image sensor 707, and the image sensor 707 outputs a detected signal to a signal processing circuit 708. The signal processing circuit 708 performs predetermined processing on the input detected signal, such as binarization or noise processing, and outputs the result to a distance measuring circuit 710.

The distance measuring circuit 710 determines whether the object 702 is present based on the time difference between the timing at which the light source apparatus 12 emits laser light and the timing at which the photodetector 709 receives the laser light or the phase difference among pixels of the image sensor 707 that receives light, and calculates the distance to the object 702.

The light deflector 13 having the reflection surface 14 is unlikely to be broken and is compact compared with a polygon mirror, and thus, a highly durable and compact radar can be provided.

Such a laser radar is attached to, for example, a vehicle, an aircraft, a vessel, a robot, or the like, and can perform optical scanning within a predetermined range to determine whether an obstacle is present or to recognize the distance to the obstacle.

Although the laser radar 700 has been described as an example of the object recognizing apparatus, the object recognizing apparatus is not limited to the apparatus in the above-described embodiment and may be any apparatus that performs optical scanning by controlling the light deflector 13 having the reflection surface 14 by using the control apparatus 11 and that receives reflected light by using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an invading object. The three-dimensional scanner performs optical scanning to obtain distance information, calculates object information such as the shape of the object based on the distance information to recognize the object, and outputs the object information in the form of three-dimensional data.

The embodiments of the present disclosure have been described above, and the above-described embodiments have illustrated application examples of the present disclosure. The present disclosure is not limited to the above-described embodiments and may be embodied by being deformed or modified in various manners without departing from the spirit of the present disclosure in implementation.

For example, instead of the photodiode (PD), a position sensitive detector (PSD) or a line charge-coupled device (CCD) may also be used as the light receiver 18.

In addition, the position of the light receiver 18 is not limited to somewhere on the scan surface 15 as long as the light receiver 18 is present in a scan region that is to be scanned by the light deflector 13.

The above description has illustrated examples, and specific effects are produced in each aspect below.

First Aspect

A first aspect provides the optical scanning apparatus 10 that deflects light from a light source (e.g., the lasers 501R, 501G, and 501B) in a main scanning direction and a sub-scanning direction to perform optical scanning on a scan region, including: light deflecting means (e.g., the light deflector 13) for deflecting the light from the light source at least in the sub-scanning direction to perform optical scanning on the scan region; light receiving means (e.g., the light receiver 18) for receiving, within a predetermined range in the sub-scanning direction, the light used for optical scanning performed by the light deflecting means; and control means (e.g., the control apparatus 11) for controlling the light deflecting means based on the number of times of light reception of the light receiving means at a plurality of positions in the sub-scanning direction within the predetermined range.

If the density of scan lines in the sub-scanning direction becomes high and low, intervals between positions of scan lines in the sub-scanning direction at which the light receiving means receives light within the predetermined range in the sub-scanning direction are changed. This changes the number of times of light reception of the light receiving means within the predetermined range. For example, if the density of scan lines becomes low, intervals between positions of scan lines in the sub-scanning direction at which the light receiving means receives light within the predetermined range in the sub-scanning direction are increased, and thus, the number of times of light reception of the light receiving means within the predetermined range is decreased. In contrast, if the density of scan lines becomes high, intervals between positions of scan lines in the sub-scanning direction at which the light receiving means receives light within the predetermined range in the sub-scanning direction are decreased, and thus, the number of times of light reception of the light receiving means within the predetermined range is increased. Accordingly, based on the number of times of light reception of the light receiving means at the plurality of positions in the sub-scanning direction within the predetermined range, it is possible to determine whether the density of scan lines becomes high and low in the sub-scanning direction.

According to this aspect, the light deflecting means is controlled based on the number of times of light reception of the light receiving means at the plurality of positions in the sub-scanning direction within the predetermined range. This makes it possible to improve the high and low density of scan lines in the sub-scanning direction.

Second Aspect

According to a second aspect, in the first aspect, the control means controls the light deflecting means such that the number of times of light reception is restored to a predetermined number of times if the number of times of light reception is greater than the predetermined number of times.

This makes it possible to easily improve the high and low density of scan lines in the sub-scanning direction.

Third Aspect

A third aspect provides the optical scanning apparatus 10 that deflects light from a light source (e.g., the lasers 501R, 501G, and 501B) in a main scanning direction and a sub-scanning direction to perform optical scanning on a scan region, including: light deflecting means (e.g., the light deflector 13) for deflecting the light from the light source at least in the sub-scanning direction to perform optical scanning on the scan region; light receiving means (e.g., the light receiver 18) for receiving, within a predetermined range in the sub-scanning direction, the light used for optical scanning performed by the light deflecting means; and control means (e.g., the control apparatus 11) for controlling the light deflecting means based on a time difference between light reception timings at which the light receiving means receives light at most distant two positions in the sub-scanning direction within the predetermined range.

If the density of scan lines in the sub-scanning direction becomes high and low, intervals between positions of scan lines in the sub-scanning direction at which the light receiving means receives light within the predetermined range in the sub-scanning direction are changed. This changes the time difference between light reception timings at which the light receiving means receives light at the most distant two positions in the sub-scanning direction within the predetermined range. For example, if the density of scan lines becomes low, the time difference between light reception timings at which the light receiving means receives light at the most distant two positions in the sub-scanning direction within the predetermined range is increased. In contrast, if the density of scan lines becomes high, the time difference between light reception timings at which the light receiving means receives light at the most distant two positions in the sub-scanning direction within the predetermined range is decreased. Accordingly, based on the time difference between light reception timings at which the light receiving means receives light at the most distant two positions in the sub-scanning direction within the predetermined range, it is possible to determine whether the density of scan lines becomes high and low in the sub-scanning direction.

According to this aspect, the light deflecting means is controlled based on the time difference between light reception timings at which the light receiving means receives light at the most distant two positions in the sub-scanning direction within the predetermined range. This makes it possible to improve the high and low density of scan lines in the sub-scanning direction.

Fourth Aspect

According to a fourth aspect, in the third aspect, the control means controls the light deflecting means such that the time difference is restored to a predetermined time if the time difference is greater than the predetermined time.

This makes it possible to easily improve the high and low density of scan lines in the sub-scanning direction.

Fifth Aspect

According to a fifth aspect, in any of the first to fourth aspects, the light receiving means receives, on a single light receiving surface, light emitted to the predetermined range.

This makes it possible to improve the high and low density of scan lines in the sub-scanning direction with a simple configuration.

Sixth Aspect

According to a sixth aspect, in any of the first to fourth aspects, the light receiving means receives, on different light receiving surfaces, light emitted to the predetermined range.

This makes it possible to improve the high and low density of scan lines in the sub-scanning direction with a simple configuration.

Seventh Aspect

According to a seventh aspect, in any of the first to sixth aspects, the number of times of light reception or the light reception timing includes the number of times of light reception or the light reception timing of the light receiving means during different optical scanning steps on the scan region.

This can shorten the time of light emission of the light source in a single scan and can suppress an increase in temperature.

Eighth Aspect

According to an eighth aspect, in any of the first to seventh aspects, the predetermined range includes positions for which an interval is the largest or smallest when speed of scanning in the sub-scanning direction performed by the light deflecting means varies.

Accordingly, the number of times of light reception of the light receiving means at a plurality of positions in the sub-scanning direction within the predetermined range, or the time difference between light reception timings at which the light receiving means receives light at most distant two positions in the sub-scanning direction within the predetermined range, is changed more sensitively depending on the magnitude (amplitude) of variation (unevenness) in the moving speed in the sub-scanning direction. This enables more accurate detection of the high and low density of scan lines in the sub-scanning direction, and the high and low density of scan lines can be more accurately improved.

Ninth Aspect

A ninth embodiment provides an image projecting apparatus (e.g., the head-up display 500) that scans, with light that is modulated based on image information, a scan region to project an image, including: the optical scanning apparatus 10 according to any one of the first to eighth aspects; and a projection optical system (e.g., the projection mirror 511) configured to project light emitted from the optical scanning apparatus to the scan region.

This makes it possible to project an image in which uneven brightness in the sub-scanning direction is suppressed.

Tenth Aspect

A tenth aspect provides a mobile object (e.g., the automobile 400, 701) including: the optical scanning apparatus 10 according to any one of the first to eighth aspects or the image projecting apparatus according to the ninth aspect.

This makes it possible to provide a mobile object in which the optical scanning apparatus 10 of high quality is incorporated, in which the high and low density of scan lines in the sub-scanning direction is improved.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. An optical scanning apparatus comprising:
a light source configured to emit light;
a light deflector configured to deflect the light emitted from the light source at least in a sub-scanning direction to perform optical scanning on a scan region,
wherein the light deflector includes a micro electromechanical system device,
wherein the micro electromechanical system includes a reflection surface that moves at least either monoaxially or biaxially in a reciprocal manner based on a drive signal from a controller;
a light receiver configured to receive, within a predetermined range in the sub-scanning direction, the light used for optical scanning performed by the light deflector; and
the controller, wherein the controller is configured to
calculate a number of times that the light is received by the light receiver,
compare the number of times that the light is received by the light receiver to a predetermined value, and
adjust the drive signal when the number of times that the light is received by the light receiver is greater than the predetermined value.

2. The optical scanning apparatus according to claim 1, wherein the controller is configured to adjust the drive signal such that the number of times that the light is received by the light receiver is restored to a predetermined number of times if the number of times that the light is received by the light receiver is greater than the predetermined number of times.

3. The optical scanning apparatus according to claim 1, wherein the light receiver receives, on a single light receiving surface, light emitted to the predetermined range.

4. The optical scanning apparatus according to claim 1, wherein the light receiver receives, on different light receiving surfaces, light emitted to the predetermined range.

5. The optical scanning apparatus according to claim 1, wherein the number of times that the light is received by the light receiver comprises a number of times that the light is received by the light receiver during different optical scanning steps on the scan region.

6. The optical scanning apparatus according to claim 1, wherein the predetermined range comprises positions for which an interval is the largest or smallest when speed of scanning in the sub-scanning direction performed by the light deflector varies.

7. An optical scanning apparatus comprising:
a light source configured to emit light;
a light deflector configured to deflect the light emitted from the light source at least in a sub-scanning direction to perform optical scanning on a scan region,
wherein the light deflector includes a micro electromechanical system device,
wherein the micro electromechanical system includes a reflection surface that moves at least either monoaxially or biaxially in a reciprocal manner based on a drive signal from a controller;
a light receiver configured to receive, within a predetermined range in the sub-scanning direction, the light used for optical scanning performed by the light deflector; and
the controller, wherein the controller is configured to
calculate a time difference between a first time at which the light receiver receives the light at a first position and a second time at which the light receiver receives the light at a second position, the first and second positions being the most distant positions from each other in the sub-scanning direction within the predetermined range,
compare the time difference to a predetermined value, and
adjust the drive signal when the time difference is greater than the predetermined value.

8. The optical scanning apparatus according to claim 7, wherein the controller is configured to adjust the drive signal such that the time difference is restored to a predetermined time if the time difference is greater than the predetermined time.

9. The optical scanning apparatus according to claim 7, wherein the light receiver receives, on a single light receiving surface, light emitted to the predetermined range.

10. The optical scanning apparatus according to claim 7, wherein the light receiver receives, on different light receiving surfaces, light emitted to the predetermined range.

11. The optical scanning apparatus according to claim 7, wherein the first time and second time comprise times when the light receiver receives the light during different optical scanning steps on the scan region.

12. The optical scanning apparatus according to claim 7, wherein the predetermined range comprises positions for which an interval is the largest or smallest when speed of scanning in the sub-scanning direction performed by the light deflector varies.

13. An image projecting apparatus comprising:
an optical scanning apparatus including
a light source configured to emit light,
a light deflector configured to deflect the light emitted from the light source at least in a sub-scanning direction to perform optical scanning on a scan region,
wherein the light deflector includes a micro electromechanical system device,
wherein the micro electromechanical system includes a reflection surface that moves at least either monoaxially or biaxally in a reciprocal manner based on a drive signal from a controller, a light receiver configured to receive, within a predetermined range in the sub-scanning direction, the light used for optical scanning performed by the light deflector, and the controller, wherein the controller is configured to
calculate a number of times that the light is received by the light receiver,
compare the number of times that the light is received by the light receiver to a predetermined value, and
adjust the drive signal when the number of times that the light is received by the light receiver is greater than the predetermined value; and a projection optical system configured to project light emitted from the optical scanning apparatus to the scan region, wherein the light deflector of the optical scanning apparatus scans, with light that is modulated based on image information, the scan region to project an image.

14. A mobile object comprising:
an optical scanning apparatus including a light source configured to emit light, a light deflector configured to deflect the light emitted from the light source at least in a sub-scanning direction to perform optical scanning on a scan region, wherein the light deflector including includes a micro electromechanical system device, wherein the micro electromechanical system includes a reflection surface that moves at least either monoaxially or biaxially in a reciprocal manner based on a drive signal from a controller, a light receiver configured to receive, within a predetermined range in the sub-scanning direction, the light used for optical scanning performed by the light deflector, and the controller, wherein the controller is configured to calculate a number of times that the light is received by the light receiver, compare the number of times that the light is received by the light receiver to a predetermined value, and adjust the drive signal when the number of times that the light is received by the light receiver is greater than the predetermined value; and a projection optical system configured to project light emitted from the optical scanning apparatus to the scan region, wherein the light deflector of the optical scanning apparatus scans, with light that is modulated based on image information, the scan region to project an image.

* * * * *